United States Patent [19]

Hague et al.

[11] 4,008,515
[45] Feb. 22, 1977

[54] METHOD OF TRANSPORTING TOOLHOLDER

[75] Inventors: Robert Z. Hague, Oradell; George J. Loos, Parsippany, both of N.J.; Matthew F. Marsicano, Forest Hills, N.Y.

[73] Assignee: Textron, Inc., Providence, R.I.

[22] Filed: June 3, 1975

[21] Appl. No.: 583,468

Related U.S. Application Data

[62] Division of Ser. No. 501,865, Aug. 30, 1974.

[52] U.S. Cl. .................................. 29/426; 29/568; 90/11 D
[51] Int. Cl.² ......................................... B23Q 3/157
[58] Field of Search .............. 29/568, 426; 90/11 D

[56] References Cited

UNITED STATES PATENTS

| | | | |
|---|---|---|---|
| 3,414,967 | 12/1968 | Erikson | 29/568 |
| 3,608,188 | 9/1971 | Seidel | 29/568 |
| 3,811,179 | 5/1974 | Anderson | 29/568 |
| 3,868,886 | 3/1975 | Bondie | 90/11 D |

Primary Examiner—Othell M. Simpson
Assistant Examiner—Z. R. Bilinsky
Attorney, Agent, or Firm—Arthur A. Johnson

[57] ABSTRACT

There are disclosed herein methods for transporting a toolholder between a tool storage rack and a machine tool spindle which include the steps of, in one continuous operation, causing a tool carrier to remove a toolholder from said storage rack and transport the toolholder to the position of the machine tool spindle, causing the tool carrier to be raised to and deposit the toolholder in the spindle, causing the tool carrier while still raised to disengage the toolholder and return to a position remote from the spindle. After the work has been performed by the toolholder, in one continuous operation, advancing the tool carrier to the spindle to engage the toolholder, causing the tool carrier to descend to withdraw the toolholder from the spindle, then be raised and return the toolholder to the storage rack, said reverse operations being caused by reversing the direction of operation of means for supplying power to said tool carrier.

6 Claims, 52 Drawing Figures

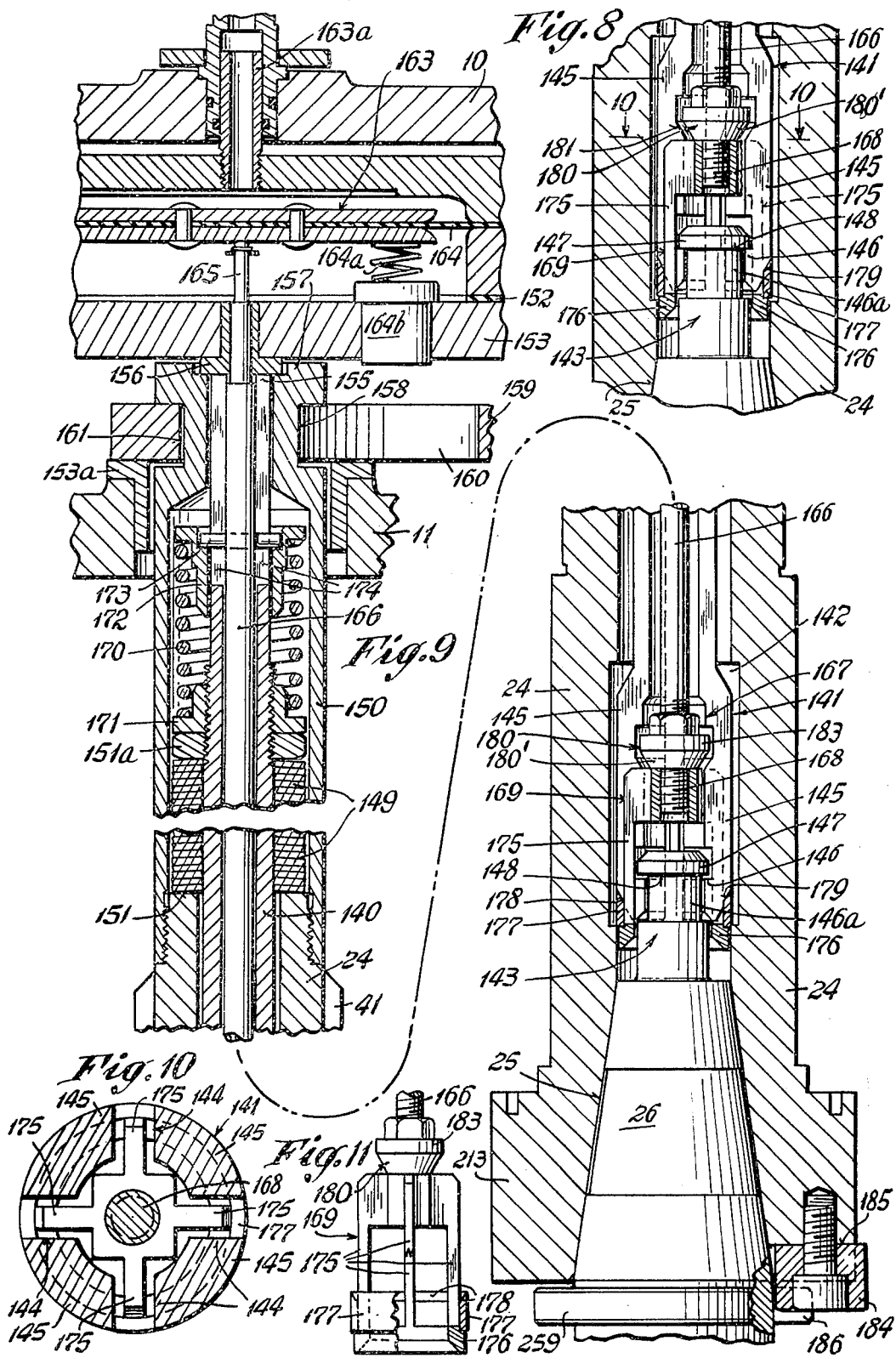

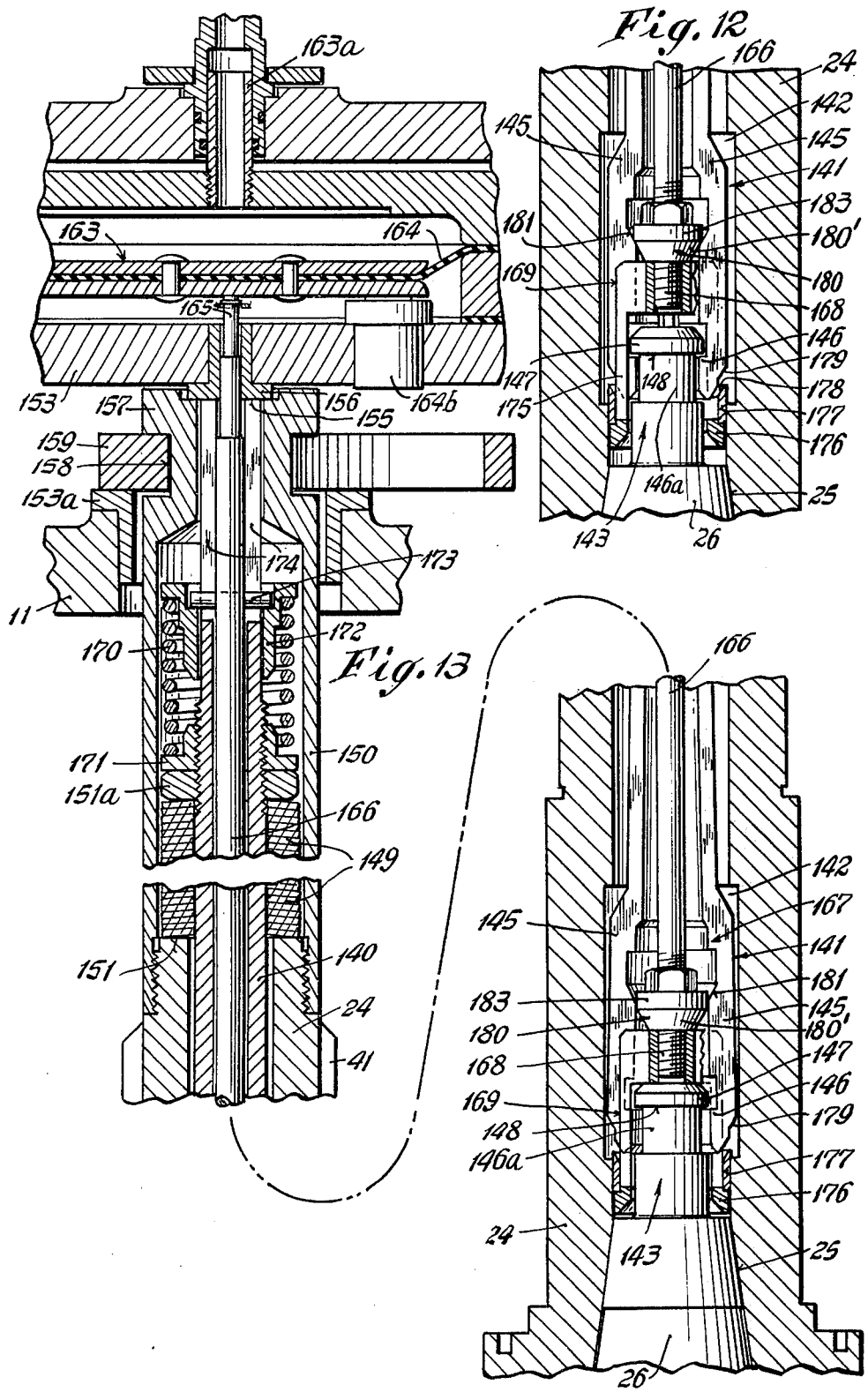

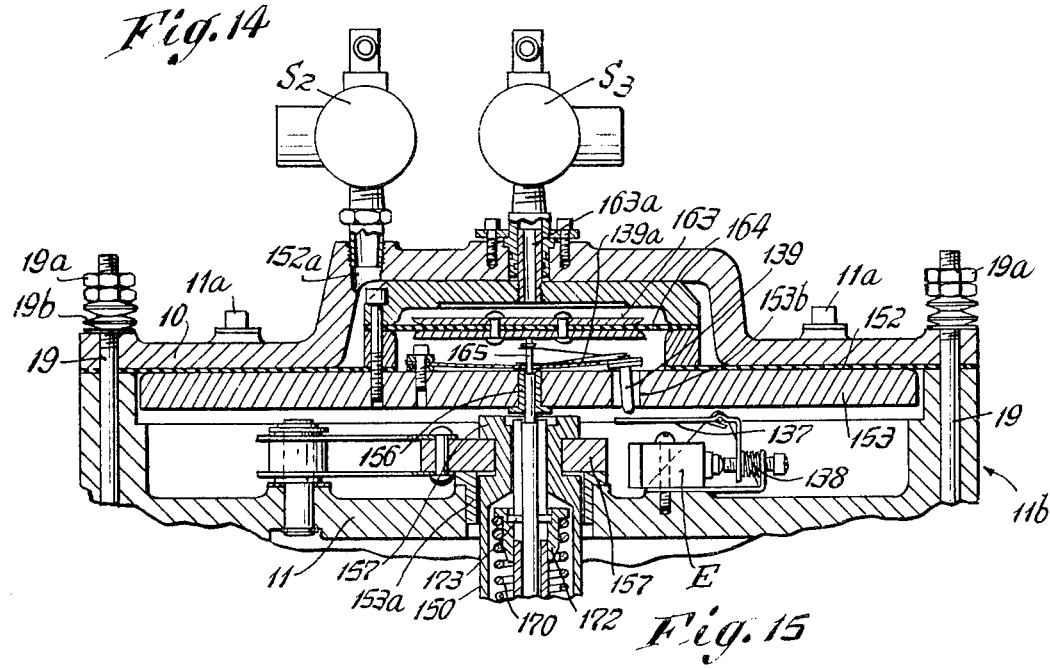
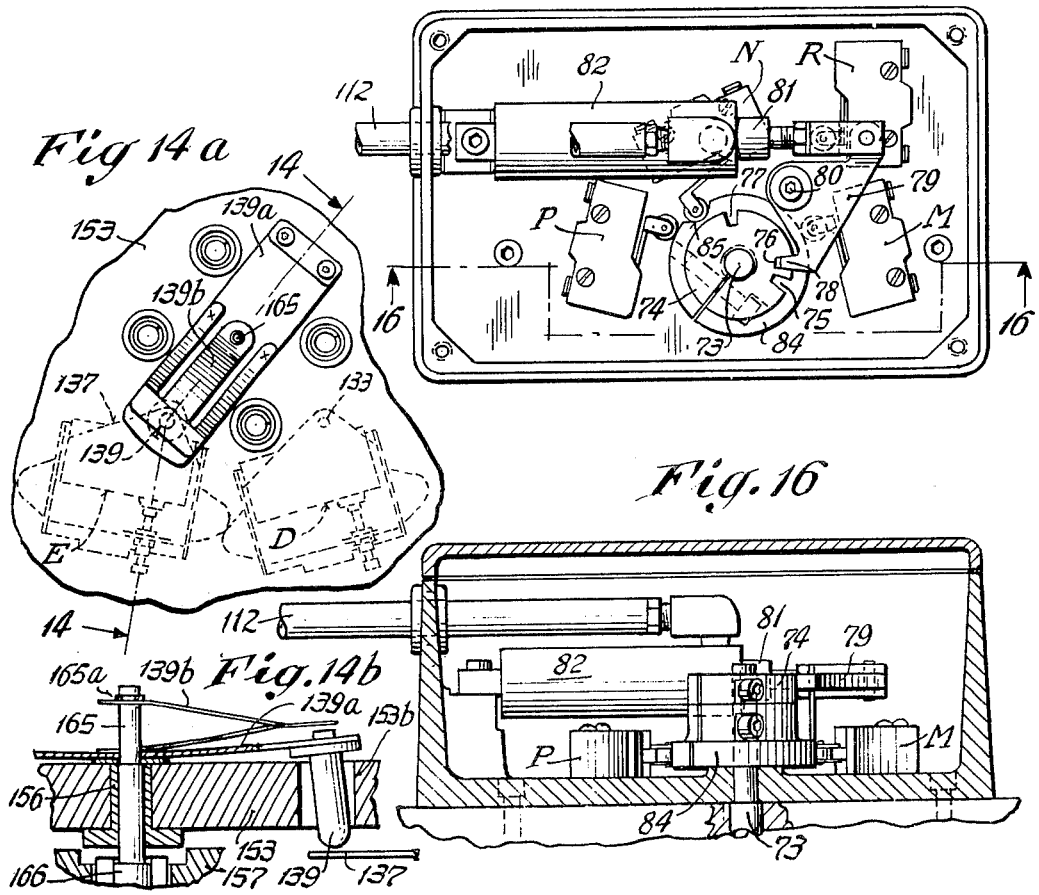

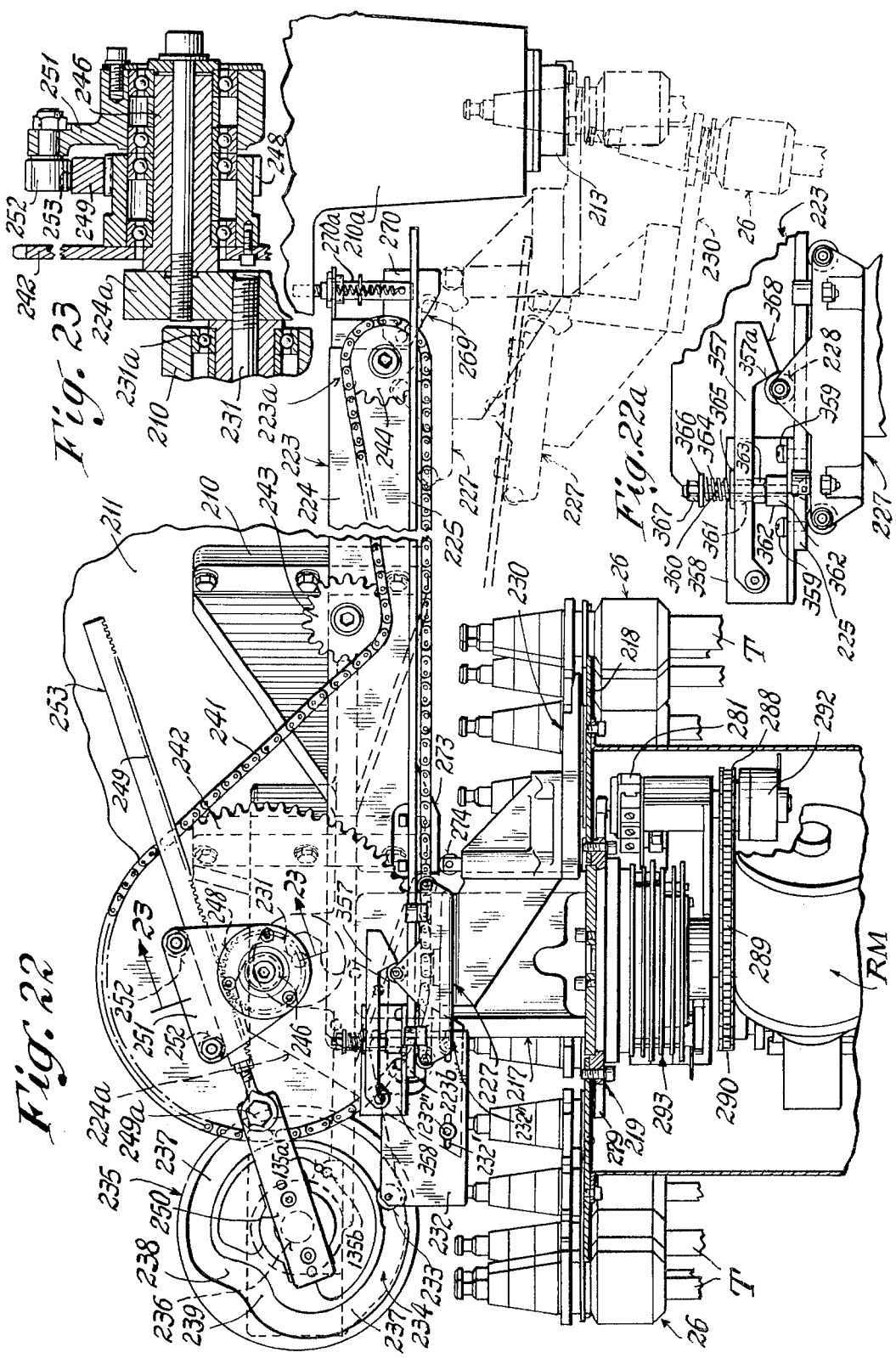

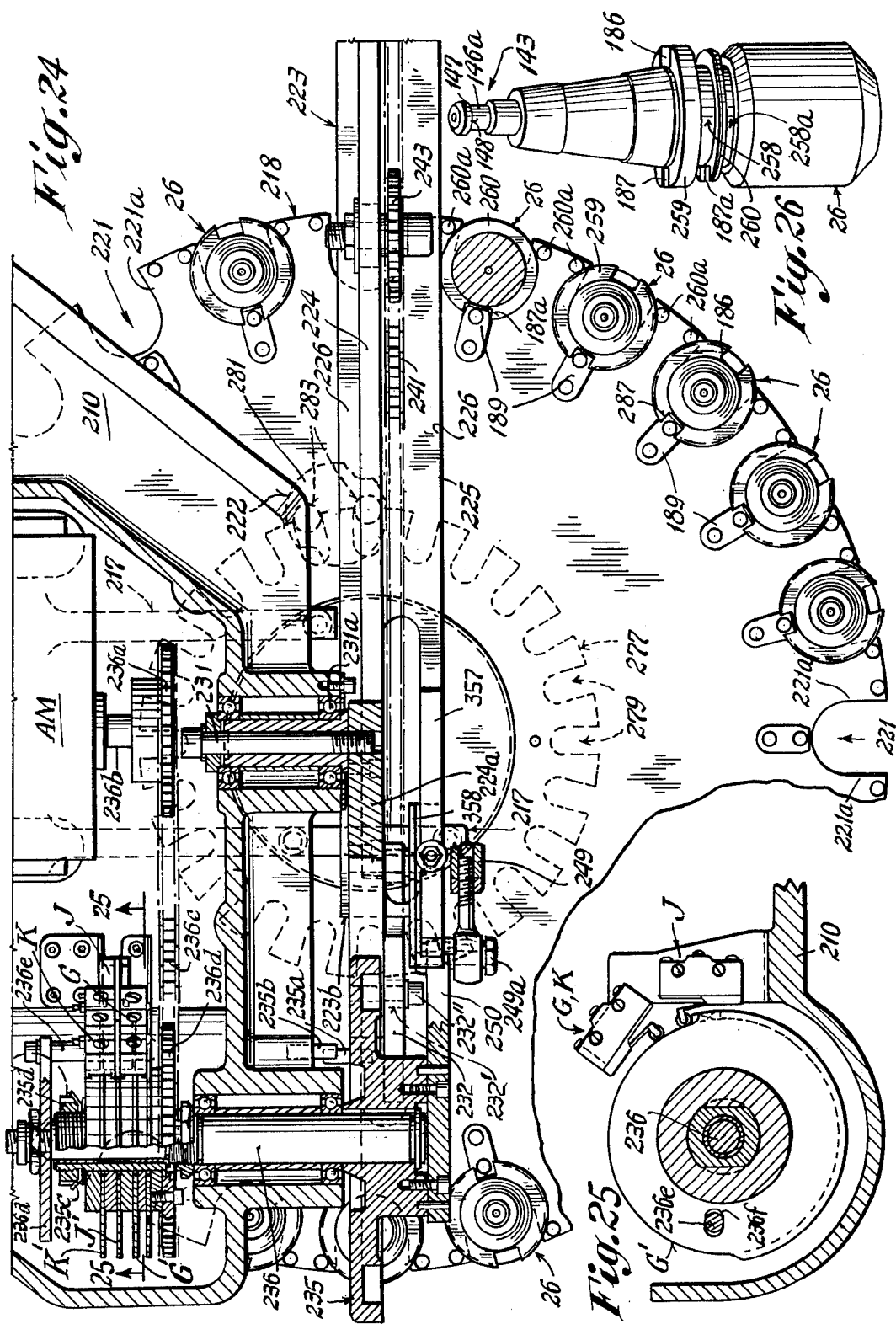

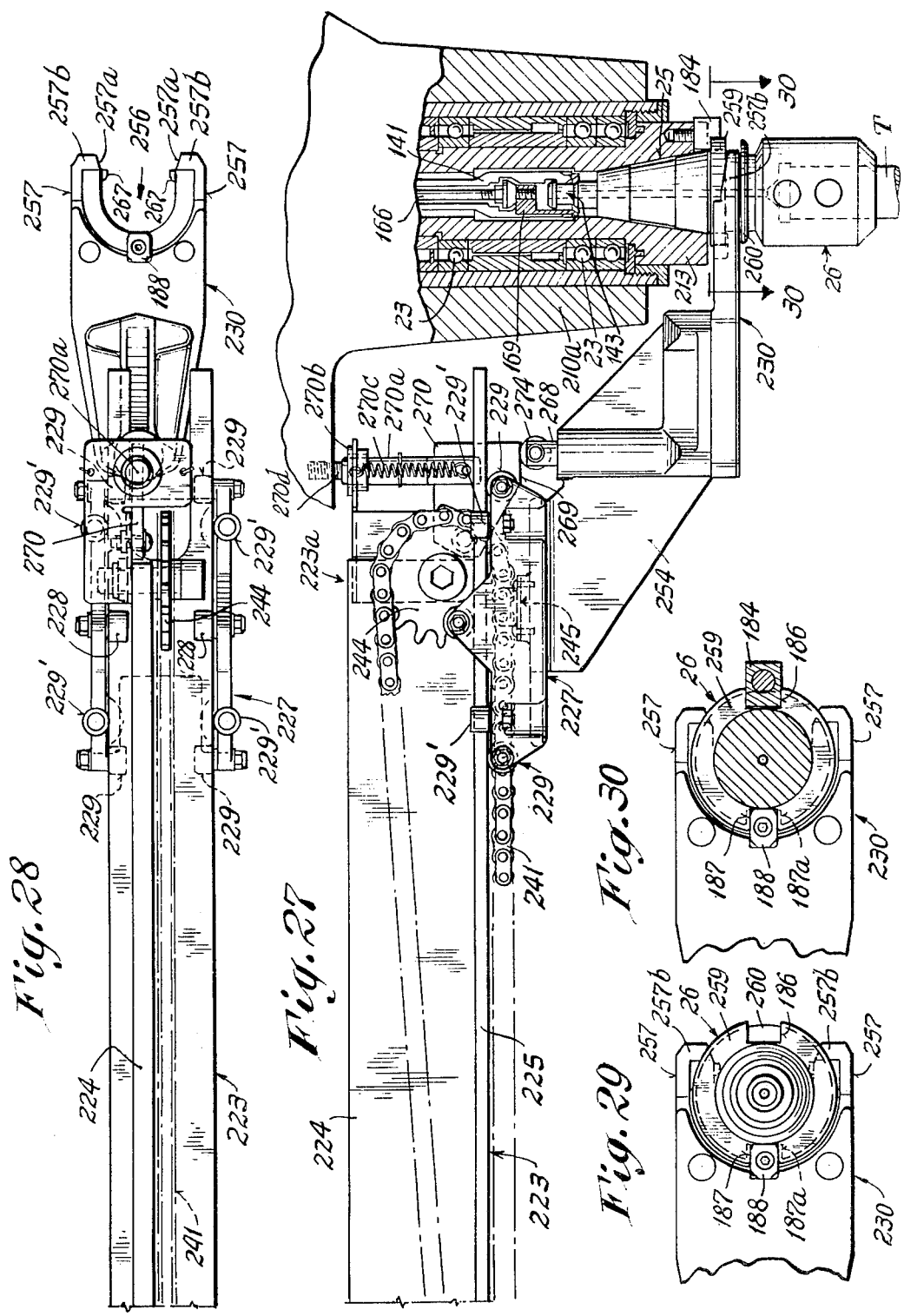

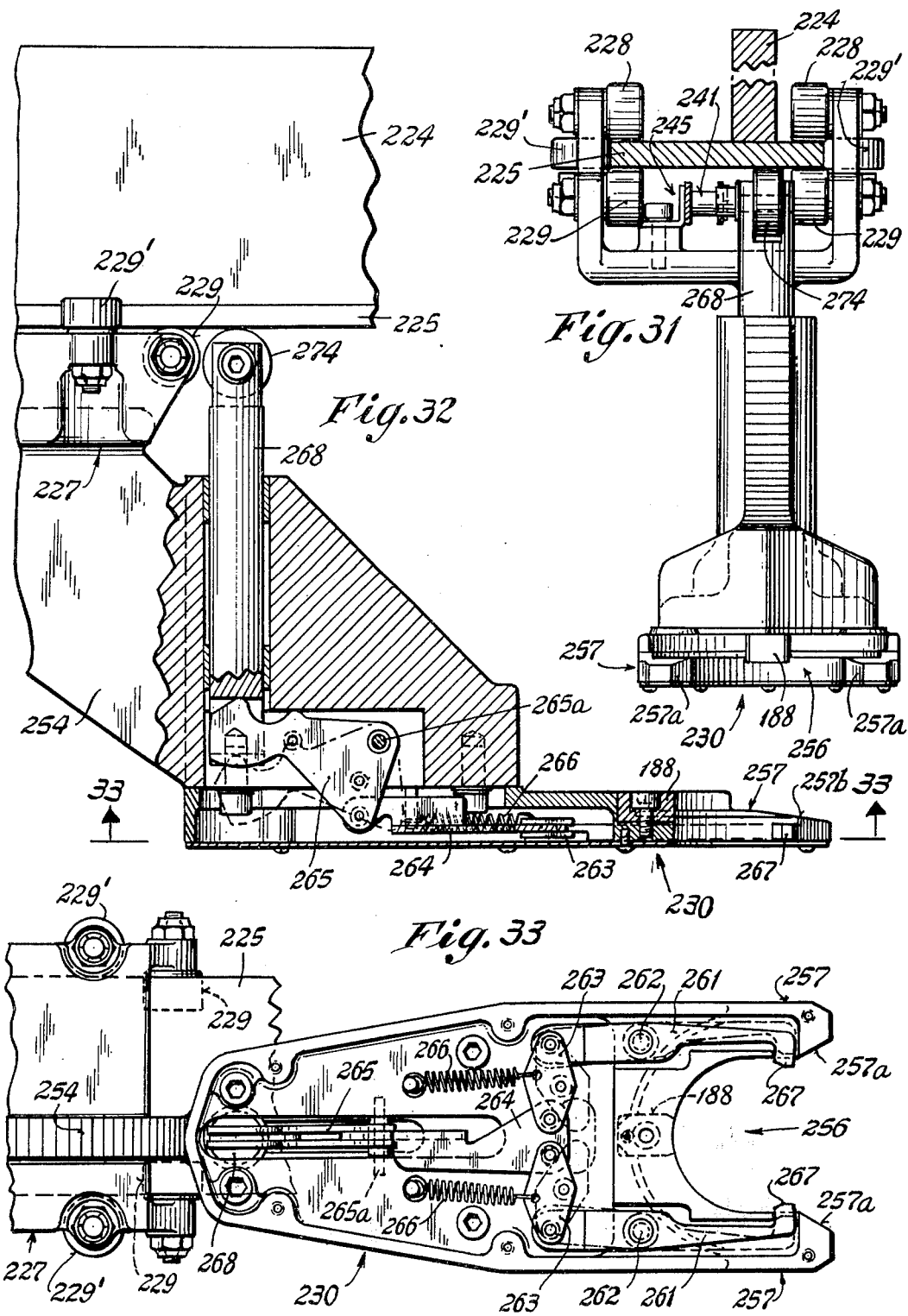

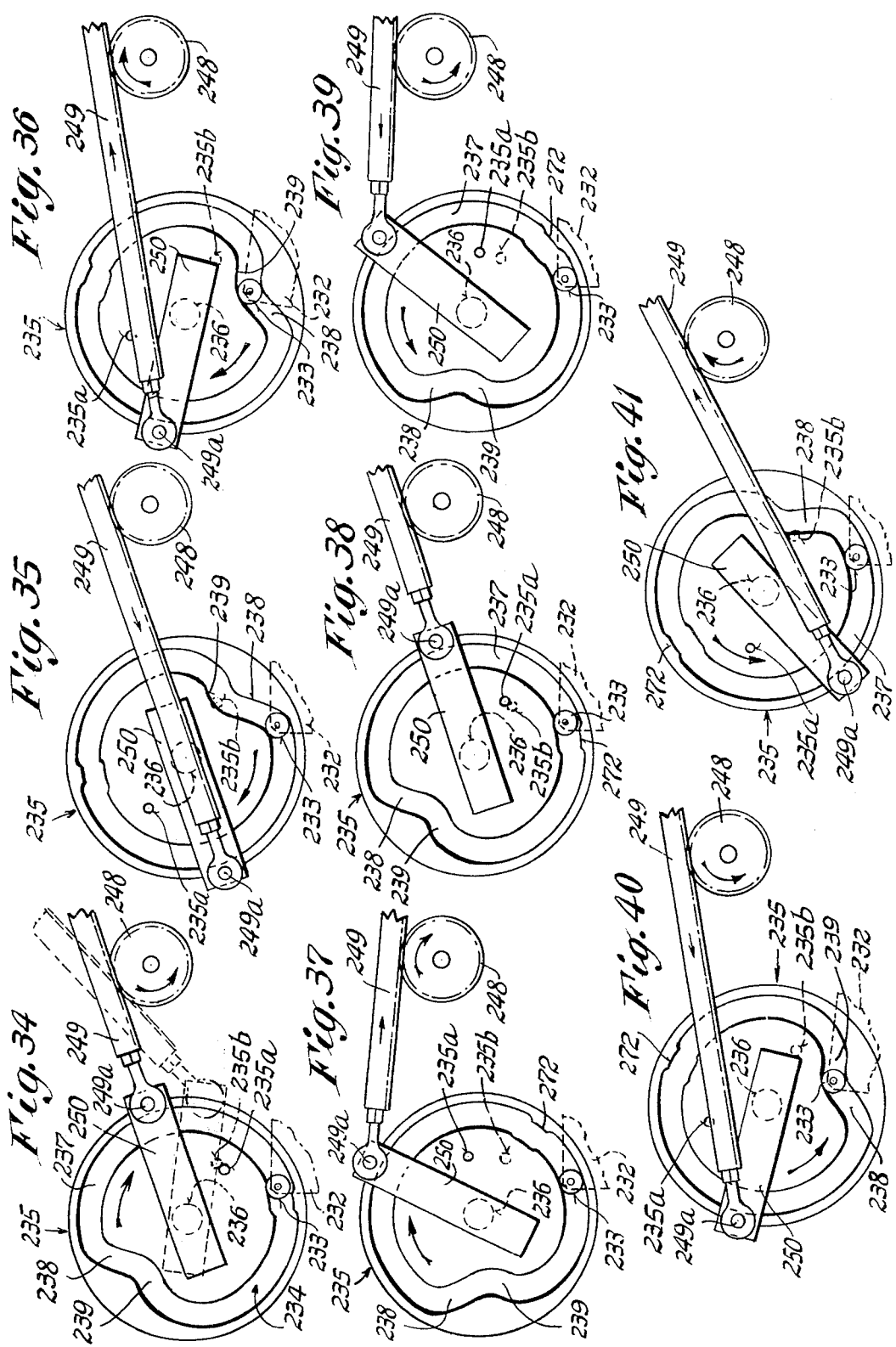

METHOD OF TRANSPORTING TOOLHOLDER

This is a division of application Ser. No. 501,865, filed Aug. 30, 1974.

This invention relates to machine tools and more particularly to a spindle unit for use in such machines and means for automatically transporting a toolholder and tool to and from the spindle.

The apparatus disclosed herein for transferring the toolholder between an indexable toolholder storage means to the spindle of a machine tool is disclosed and claimed in out application Ser. No. 501,865, filed Aug. 30, 1974.

The herein disclosed spindle change speed unit is disclosed and claimed in our application Ser. No. 566,375, filed Apr. 9, 1975.

The spindle and drawbar mechanism herein is disclosed and claimed in our application Ser. No. 562,632, filed Mar. 27, 1975.

Heretofore, it was known to provide a spindle unit for machine tools in which the tool holding end of the spindle has a tapered socket in its nose to receive and hold a toolholder provided with an adapter, and to engage the adapter with finger hooks carried by the drawbar so that when the finger hooks are engaged and the drawbar is pulled inwardly by powerful spring means the toolholder will be solidly seated in the socket. To release the toolholder for removal from the spindle, it was necessary to reverse the operations and push the drawbar inwardly a substantial distance against the force of said spring and this required considerable power.

This expenditure of power is avoided by the present invention by moving the drawbar only enough to relieve the pressure between the finger hooks and the adapter, and by providing additional means for withdrawing the finger hooks to positions clear of the adapter so that the toolholder may be removed from the spindle. The finger hook-retracting means according to the present invention includes means for locking the finger hooks in adapter-engaging position and means for unlocking the hooks when the toolholder is to be removed from the spindle.

There is a further advantage obtained by the present invention and that is because the finger hooks are mechanically locked in adapter-engaging position by means movable independently of the drawbar.

In the embodiment of the invention disclosed herein the pressure is removed from between the surfaces of the hooks and the cooperating surface on the toolholder adapter by pneumatic means which moves the drawbar slightly, that is, only enough to take the pressure off the contacting surfaces. When this has happened, additional pneumatic operated means are operated to unlock the hooks and spread them so as to be clear of the cooperating surface on the adapter and, therefore, leave the toolholder free to be removed from the spindle. Preferably, the finger hook-retracting and locking means also engages the top surface of the toolholder to strike it with a hammer blow sufficiently to break any adhesion existing between the steep tapered surface of the toolholder and that of the spindle.

To drive the tool positively by the spindle, it was known heretofore to provide cooperating driving elements on both the end of the spindle and the adjacent portion of the toolholder. When these elements have close fit one relative to the other, means have been provided for orienting the toolholder relative to the spindle.

For this purpose there is provided by the present invention a resolver which is connected to a sleeve rotatably connected to the spindle and which in a known manner causes rotation of the spindle to be stopped, when returning to tool-changing position, in a determinate angular orientation in the spindle housing, in which position the cooperating driving elements are aligned with each other for free sliding engagement.

Another feature of this invention is the provision of means for relieving the quill and the quill nut of the excessive force which would be applied to the spindle when the drawbar is moved to relieve the pressure of the finger hooks from the adapter preparatory to the withdrawal of the hooks from the adapter.

A further feature is the provision of means for applying a hammer blow to the push rod to cause the end of the latter to strike the top of the adapter and dislodge the toolholder from the spindle nose.

Another feature of this invention is the provision of improved pneumatically operated gear shift means and automatically operated means for locking the gear shift means in the selected setting against accidental movement.

Another feature is the provision of improved means for automatically operated tool ejection and retention means so that the spindle unit of the present invention may be used with tool changing means having means for storing a plurality of working tools, as in a rack, and transferring selected tools in predetermined order to and from the spindle unit as determined by suitable programming means.

This invention also relates to means for automatically inserting in a spindle of a machine tool a toolholder and removing the same and replacing it with a selected one of a group of toolholders supported in a toolholder rack.

Heretofore there has been proposed various forms of automatic tool changers for use with machine tools, such as drilling and milling machines, but these have been quite complicated and inconvenient to install and use. Besides, some of the prior tool changing attachments have been quite expensive to manufacture and maintain.

An object of this invention is to provide an improved automatic tool storing, selecting and transporting machine which is simple in construction and convenient to install on a machine tool frame, easy to adjust and repair, and economical to manufacture. In addition, this invention provides such an automatic tool changer which can be operated at high speed, thereby saving time in transferring a used tool from the spindle back to a storage rack from which it had previously been taken, indexing the storage rack, and taking another tool from the storage rack and transferring it to the spindle.

Another feature of the invention is the provision of a tool changer which is adaptable to existing milling and drilling machines and does not require changes in the tool-driving mechanism or the quill-operating mechanism presently existing in drilling and milling machines.

Another feature of this invention is the provision of an automatic tool changer in which all parts of the tool changer are located remote from the vicinity of the spindle, the work support and the work to be performed upon when the tool is being used and leaving the normal working space between the nose of the spindle and the worktable unobstructed.

Another feature is the provision of a tool rack in the form of a circular turntable having sockets in its peripheral edge to removably receive and hold a substantial number of toolholders with improved means, including programming means, for delivering the toolholders one at a time in predetermined succession to a carriage having a mechanical toolholder grasping hand for transferring the tool to and from the spindle of a machine tool.

Another feature of this invention is the provision of improved means for advancing the tool rack by means which acts automatically to lock the rack against unintentional movement.

Another feature of this invention is the provision of improved toolholder transfer means comprising an arm in the form of an elongate carriage track which is in a plane above that of the bottom of the spindle frame so as not to interfere with hand-access to the spindle, the carriage being mounted on and suspended below the track on the arm and having a forwardly extending mechanical hand positioned to deliver a toolholder below the socket at the nose of the spindle, the arm being mounted to be lowered and raised at its delivery end to place the toolholder in the spindle socket. With the arm still raised the hand is then withdrawn from the spindle and returned empty to the place over the rack from whence it came where it cannot interfere with the operation of the machine tool.

Another feature of this invention is the provision of an improved method for changing tools in a machine tool by transferring toolholders carrying such tools individually from a storage rack to and from the spindle of a machine comprising the steps of transporting an empty toolholder grasping hand from a position remote from the spindle to a position adjacent the spindle of the machine tool and there causing the mechanical hand to grasp the toolholder in the spindle; causing relative vertical movement between the mechanical hand and the spindle to retract the toolholder from the spindle; transporting the mechanical hand and the toolholder thereon back to a toolholder rack and depositing the toolholder in the place thereon from whence it came, all in one continuous operation; then moving the toolholder rack to present the next tool to be used in front of the hand; and then in another continuous operation advancing the hand and causing it to grasp a selected toolholder in the rack; continuing to advance the hand to the empty spindle; causing relative movement between the hand and the spindle to deposit the toolholder in the spindle, and return the empty hand to the tool rack to a position remote from the spindle.

Preferably, in carrying out the above method the mechanical toolholder grasping hand is mounted on a carriage riding on a track on an arm extending between a point over the tool rack to a point adjacent the spindle, and the relative movement whereby the toolholder is deposited in and extracted from the spindle is produced by raising and lowering the portion of said arm located adjacent the spindle.

Another feature of this invention is the provision of means whereby the step of extracting the toolholder from the spindle and the step of depositing the new toolholder in the spindle are accomplished by using a reversible electric motor and without the use of reverse gear mechanism. The direction of operation of the motor is reversed when the empty toolholder hand comes to rest over the rack after depositing the used toolholder in the rack.

Another feature of this invention is the provision of improved means including the circuitry and electrical components for controlling and operating the spindle, the toolholder carriage and the tool rack in predetermined sequence and as a consequence of the completion of preceding operations.

Other features and advantages will hereinafter appear.

To avoid the repetitious qualification of several of the elements of this apparatus and parts thereof as used herein:

the word "carriage" is intended to denote any suitable means for transporting a toolholder between the storage rack and the machine tool spindle;

the word "hand" is intended to denote any suitable means on the carriage having fingers or the equivalent to grasp a toolholder and hold it securely in its transportation between the rack and the spindle;

the word "arm" is intended to denote suitable cantilever construction extending between the tool rack and vicinity of the spindle to support the carriage and hand for reciprocatory travel between the tool rack and the spindle;

the word "simultaneously" is intended to mean "in the same part of a cycle of operations" and not necessarily instantaneously; and the word "toolholder" is intended to include the work performing tool and the means to fit the tool to the spindle, unless the context refers to the construction of the means per se for holding a tool.

In the accompanying drawings:

FIG. 2a is a view of the upper limit switch and the quill plate by which it is operated.

FIG. 8 is a vertical section of the finger-carrying portion of the drawbar, a portion of the toolholder and a portion of the push rod and the means thereon for locking the finger hooks engaging the adapter of the toolholder.

FIG. 9 is a dissected vertical section on an enlarged scale of the upper and lower portions of the spindle unit showing the drawbar advanced slightly to relieve the pressure of the hooks on the adapter.

FIG. 10 is a horizontal section taken on the line 10—10 of FIG. 8 showing the lower end of the push rod and the finger hooks of the drawbar in section.

FIG. 11 is an elevation, partly in section, of the body of the finger hook locking ring.

FIG. 12 is a view similar to FIG. 8 but showing the finger hooks on the end of the drawbar fingers disengaged from the adapter on the toolholder, as in FIG. 9, but with the locking ring disengaged from the ends of the finger hooks.

FIG. 13 is a dissected view similar to FIG. 9 but showing the drawbar finger hooks unlocked and the finger hooks expanded to a position clear of the head of the adapter.

FIG. 14 is a vertical section of the top portion of the spindle unit showing in section the diaphragm means for operating the drawbar and the means for operating the push rod which operates the hook-releasing means.

FIG. 14a is a plan view of the top surface of the large diaphragm showing the means for holding the push rod pin up until the secondary diaphragm operates.

FIG. 14b shows on a larger scale the means for holding the push rod pin up until the secondary diaphragm operates.

FIG. 15 is a side elevation showing means for controlling the operation of and the locking of the gear shift means in any one of three positions, i.e., high speed driving position, low speed driving position and neutral non-driving position.

FIG. 16 is a sectional view taken on the line 16—16 of FIG. 15.

FIG. 22 is a side elevation of the toolholder storing and transporting means partly broken away to show its relation to the spindle of the machine tool.

FIG. 22a is a front elevation of detent means for preventing rebound of the carriage in returning to its terminal position over the rack.

FIG. 23 is a vertical section taken on the line 23—23 of FIG. 22 of the means for mounting the arm and the sprocket wheel.

FIG. 24 is a plan view of portions of the turntable forming the tool rack, the mechanism for operating the tool transporting carriage and a portion of the arm forming the track for the carriage.

FIG. 25 is a vertical section taken on the line 25—25 of FIG. 24.

FIG. 26 is a perspective view of a toolholder adapted for use with the present invention.

FIG. 27 is a side elevation of the outer end portion of the arm which extends between the spindle of the machine tool and the tool storage rack showing the tool transporting carriage with the mechanical hand mounted on the carriage engaging a toolholder in the spindle and the spindle frame of a machine tool shown in section.

FIG. 28 is a top plan view of the arm and hand shown in FIG. 27.

FIG. 29 is a plan view of the end of the grasping hand and toolholder carried thereon.

FIG. 30 is a sectional view taken on the line 30—30 of FIG. 27.

FIG. 31 is a front end view of the toolholder carriage and mechanical hand shown in FIGS. 27 and 28.

FIG. 32 is a side view of the end portion of the track and the toolholder carriage, portions of the tool grasping hand being in section to show the means for operating the toolholder grasping fingers of the mechanical hand.

FIG. 33 is a bottom view of the carriage taken on the line 32—32 of FIG. 32 with the bottom cover plate removed and showing the grasping hand with the fingers in operative position.

FIGS. 34 to 41 are diagrammatic views showing the relative positions of part of the means for advancing and retracting the tool carriage and the means for raising and lowering the distal end of the carriage track to deposit the toolholder in the machine tool spindle and remove it therefrom.

FIG. 47 is a top plan view of a segment of a modified tool rack and the spring fingers for holding the toolholders in the sockets.

FIG. 48 is a bottom plan view of the portion of the toolholder rack showing the spring means for retaining the toolholder in the rack sockets and showing one toolholder in section.

GENERAL CONSTRUCTION OF SPINDLE UNIT

Figure 1:
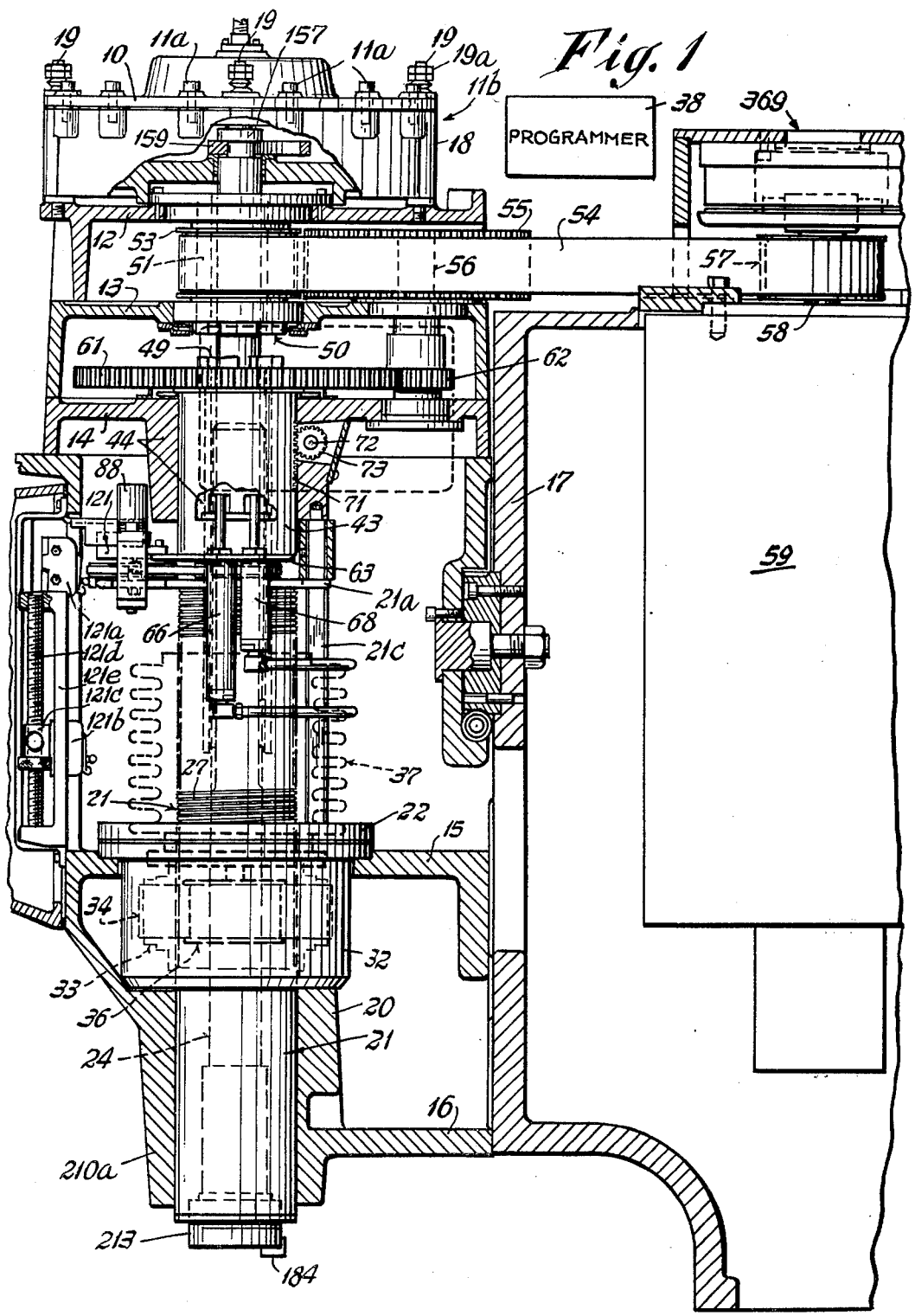
FIG. 1 is a vertical section through the framework of the spindle unit of the present invention showing the spindle and the operating mechanism therefor in elevation, the spindle being shown at the top of its stroke with the back gear in engagement with the driving gear.

As illustrated in FIG. 1, the spindle unit of the present invention comprises a frame having a top plate 10 and a lower plate 11 secured together by screws 11a and forming a dome 11b. The frame comprises a plurality of stacked units having horizontal supports 12, 13, 14, 15 and 16 on which various elements of the machine are mounted and a main vertical support 17. The dome 11b has an integral upstanding peripheral flange 18 through which extend screws 19 which are threaded into the top plate 12 and have at their upper end spring 19b and nuts 19a to resiliently hold the dome on the support 11 for a purpose referred to below.

Figure 3:
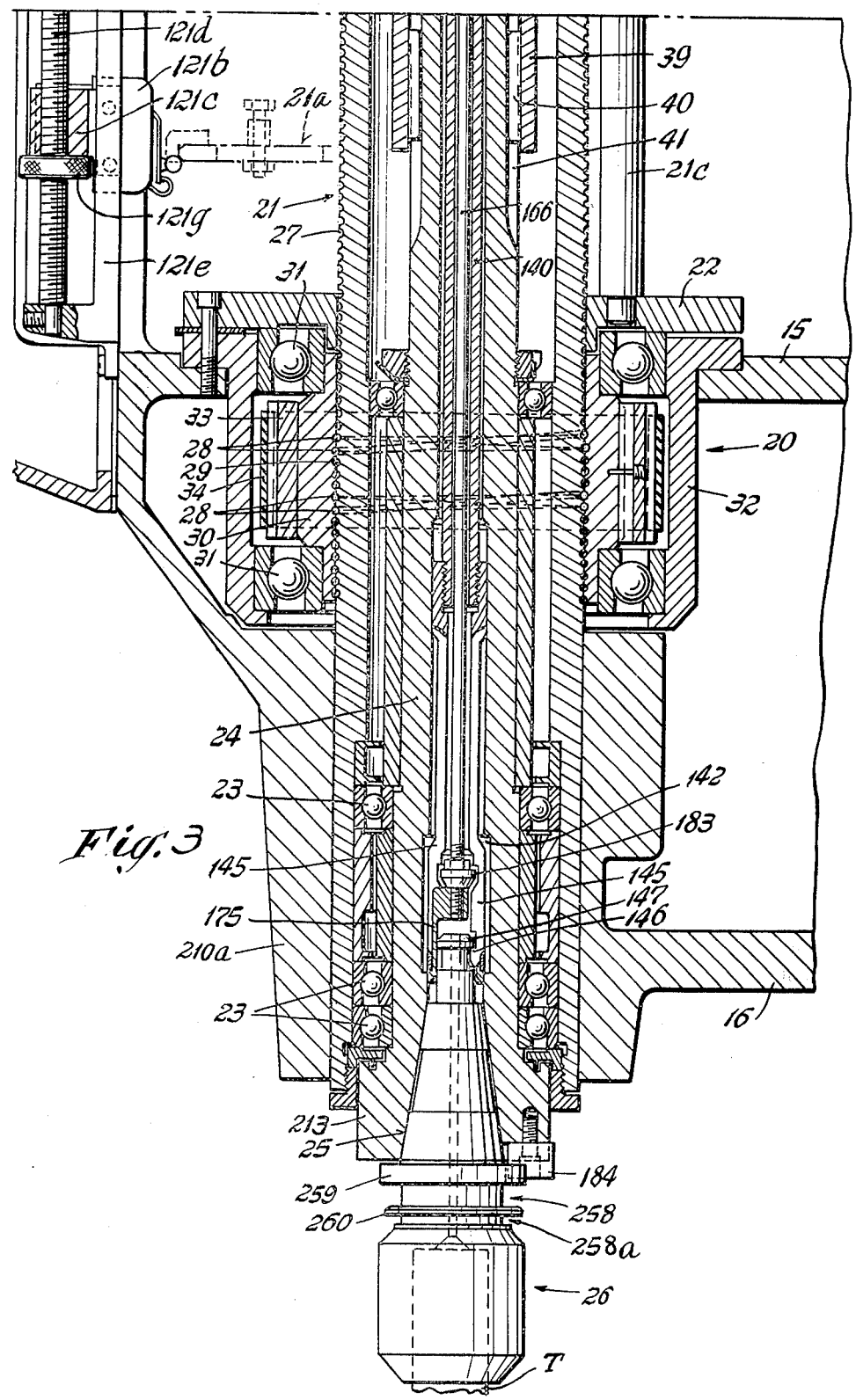
FIG. 3 is similar to FIG. 2 but shows the lower portion of the spindle unit.

Mounted in a bearing 20 formed integral with supports 15 and 16, see FIG. 3, is a quill 21 which extends upwardly and passes through an aperture in a plate 22 which, with the bearing 20, guides the quill in its vertical movements. Secured to the upper end of the quill 21 is a transversely extending plate 21a having a slot 21b which engages a vertical rod 21c mounted in the support 14 and plate 22 which prevents the plate 21a from rotating but allows it to move vertically.

The quill 21 is tubular and mounted within it for rotation on ball bearings 23 is a spindle 24 having on its nose a tapered socket 25 to releasably receive a tapered toolholder 26 and hold it and the tool T in working position. The bearings 23 for the spindle 24 are so placed that while the spindle 24 may rotate in the quill 21 it will move axially with the quill to carry a tool to and from the work.

To advance and retract the spindle 24, the quill 21 is provided with a helical groove 27 adapted to receive balls 28 carried in a similar groove 29 in a ball-nut 30 rotatably mounted on bearings 31 carried by a housing 32 secured to the support 15, see FIG. 3. The outer portion of the nut 30 constitutes a pulley 33 which is engaged by a non-slip belt 34 driven by a pulley 36 on a stepping motor 37, see FIGS. 1 and 6, so that when the motor 37 rotates in one direction the quill 21 will advance the tool T toward the work, and when the motor 37 rotates in the opposite direction the tool T will be retracted from the work. The extent of movement of the quill 21 and hence the tool T may be controlled for each tool by an operator or by programming means 38 in conjunction with upper and lower limit switches referred to below.

SPINDLE DRIVE

Figure 4:
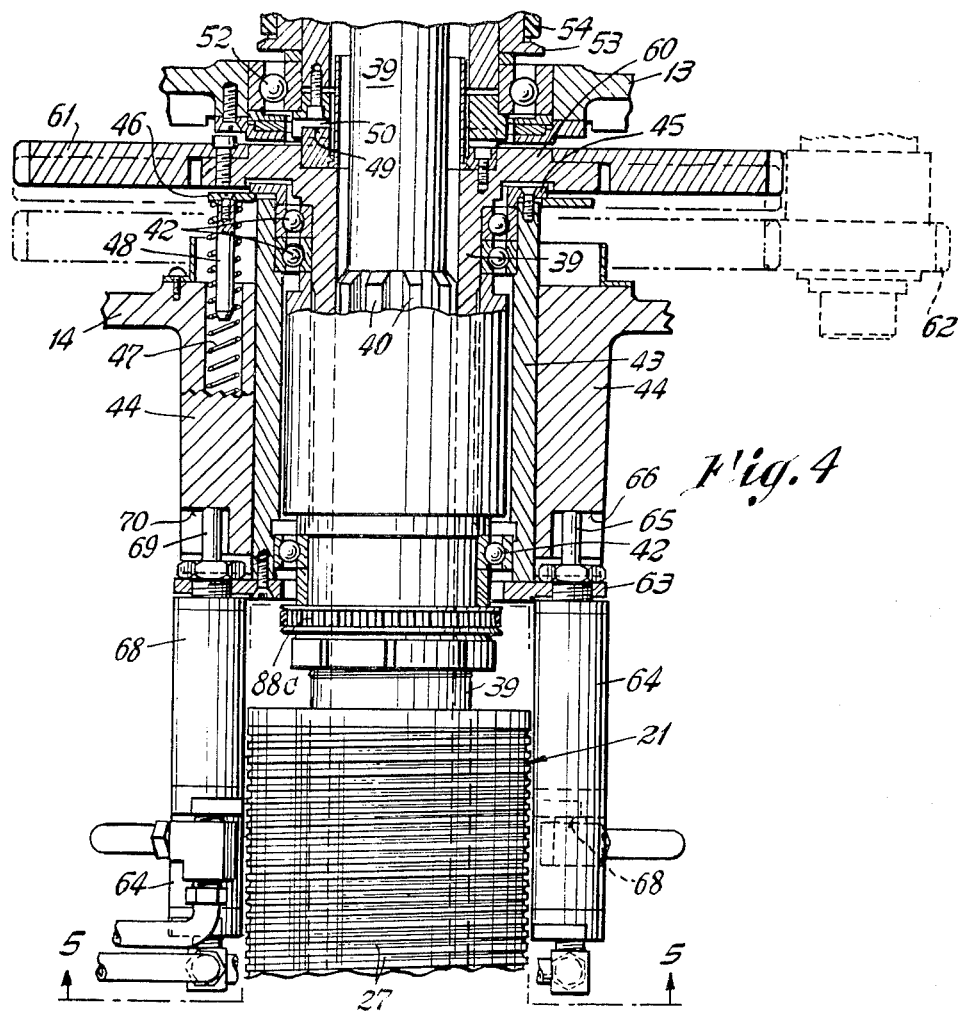
FIG. 4 is a vertical section showing the drive mechanism for rotating the spindle, the driving sleeve and the back gear being shown in full lines in high speed driving position.

To rotate the spindle 24 and thus the toolholder 26 and tool T therein, there is provided a driving sleeve 39 which surrounds the spindle 24 and has a plurality of ribs 40 slidably engaging the sides of elongate grooves 41 in the external surface of the spindle 24, see FIGS. 3 and 4, permitting the driving sleeve 39 and the spindle 24 to move vertically independently of each other while still rotating together.

The driving sleeve 39 is mounted in ball bearings 42 carried by a gear shift sleeve 43 slidably mounted for vertical movement in a bearing 44 carried by the support 14. The upper end of the gear shift sleeve 43 has a flange 45, see FIGS. 2 and 4, positioned to be engaged by a ring 46 which is engaged by a plurality of springs 47 located in cavities in the bearing 44. Pins 48 within the springs 47 guide their expanding and contracting movements.

Figure 20:
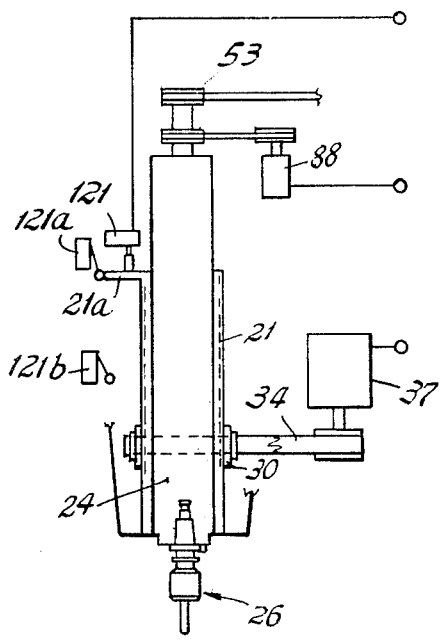
FIG. 20 is a diagrammatic view showing the relation between the limit switches, the spindle driving motor and the stepping motor for the quill.

Under the force of the springs 47, the gear shift sleeve 43 is normally urged upwardly to cause teeth 49 carried by the driving sleeve 39 to engage teeth 50, shown in FIGS. 1, 4 and 20, carried by a sleeve 51 which is rotatably mounted on bearings 52 in the supports 12 and 13.

Figure 2:
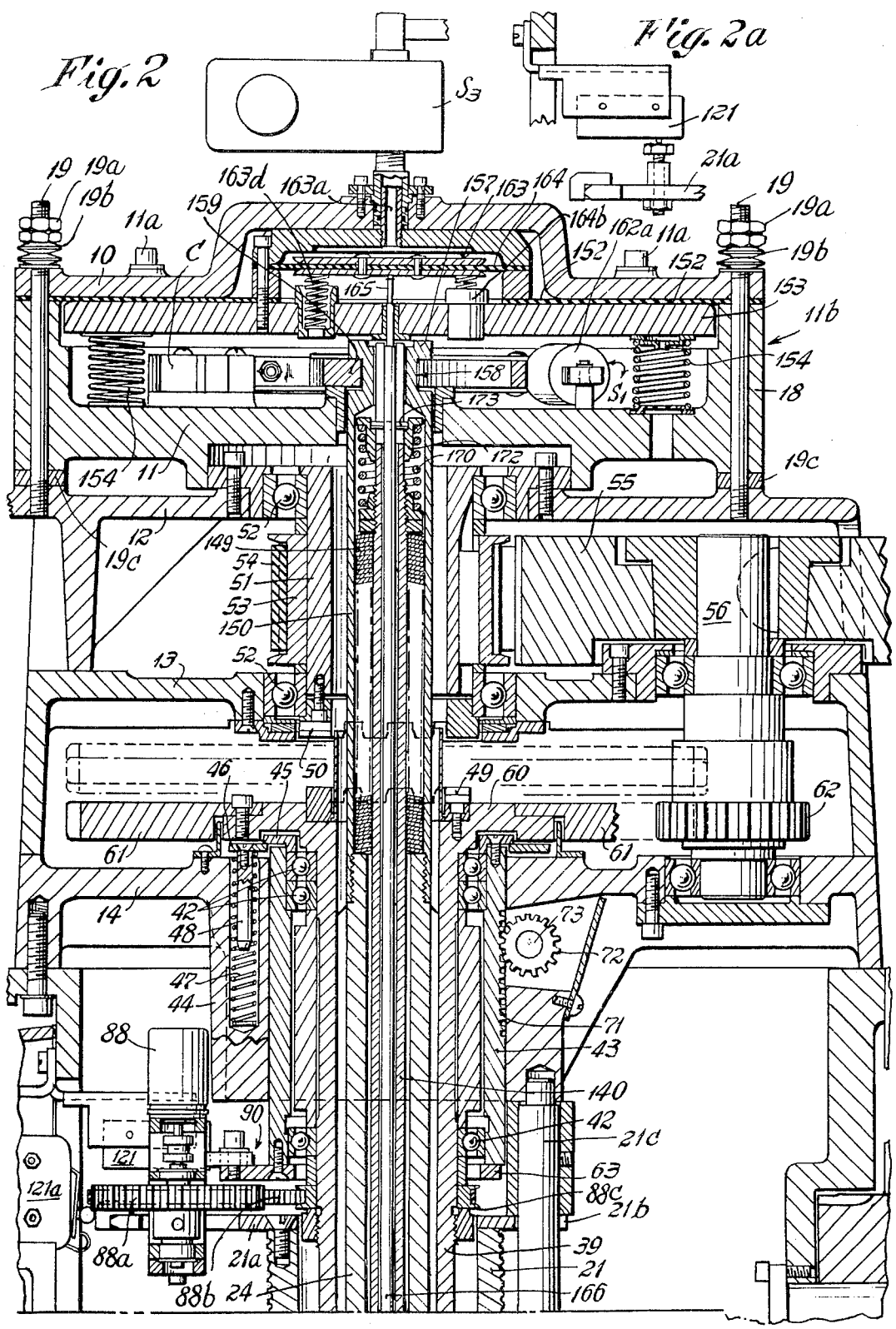
FIG. 2 is a vertical section through the upper portion of the spindle and its operating mechanism.
Figure 6:
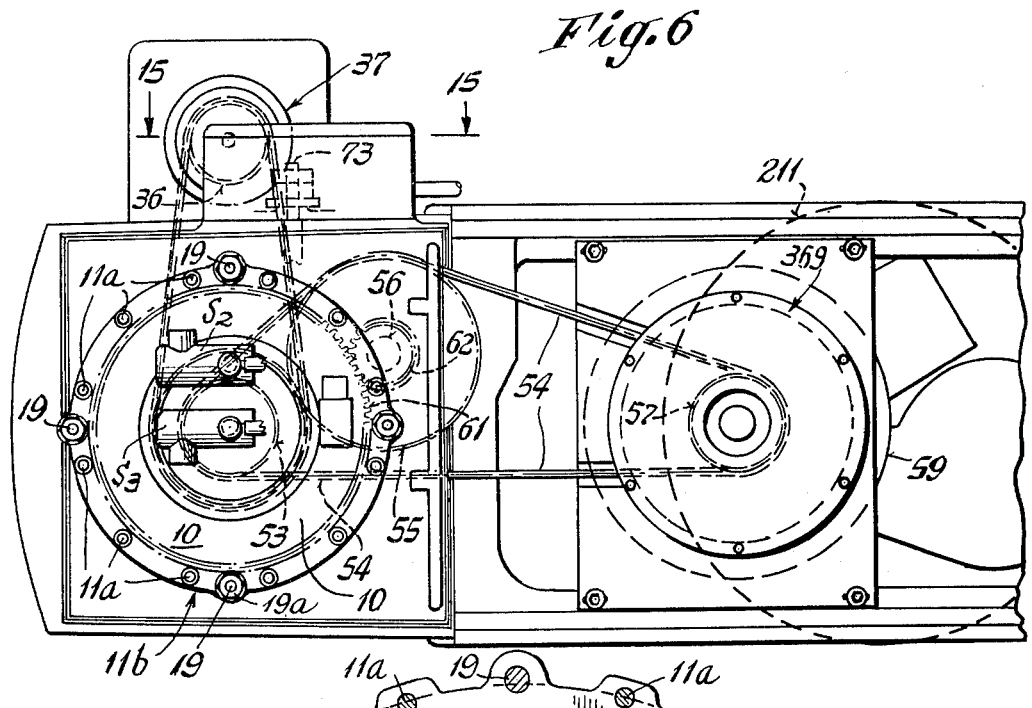
FIG. 6 is a top plan view of the spindle unit of the present invention showing the spindle drive and the quill drive and motors for operating the drives.

Secured to the sleeve 51 is a pulley 53 which is driven by a non-slip belt 54, see FIGS. 1, 2 and 6, extending over a pulley 55 mounted on a shaft 56 to a pulley 57 mounted on a shaft 58 of a variable speed spindle rotating D.C. motor 59. When the motor 59 is energized, the driving sleeve 39 and the spindle 24 will be rotated in the same direction as the motor, and at the same speed, in the embodiment of the invention shown herein wherein the pulleys 53 and 57 have the same diameter.

To increase the torque applied to the spindle 24, the relative speed of rotation of the spindle 24 is reduced under the control of the programming means 38 as explained below, the driving sleeve 39 having a flange 60 to which is secured a back gear 61 positioned to engage a driving gear 62 secured to the shaft 56 to which the pulley 55 is secured to be driven thereby. If the same direction of rotation of the spindle is to be maintained, when the speed of the spindle is thus changed, the direction of rotation of the motor 59 is also changed as will appear more fully below.

GEAR SHIFTING

Figure 5:
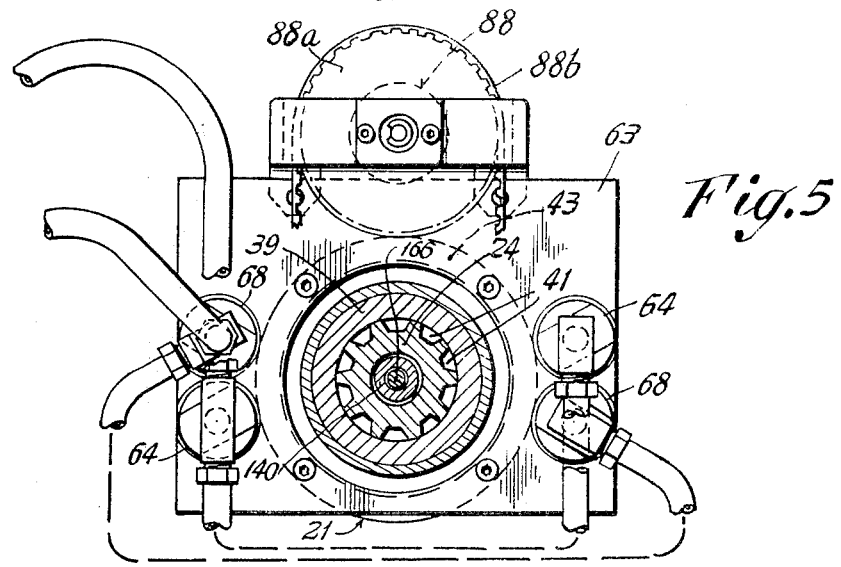
FIG. 5 is a horizontal section taken on the line 5—5 of FIG. 4 showing the resolver rotor and drive thereon and the air cylinders for operating the gear shift means for the spindle.

For the purpose of moving the gear shift sleeve 43 to low speed position, there is attached to the lower end of the sleeve 43 a plate 63, see FIG. 4, carrying a pair of air cylinders 64, see FIG. 5, the piston rods 65 of which are positioned in abutting relation against shoulders 66 on the bottom of the bearing 44. The cylinders 64 have such lengths that, when pressurized, their movement will be sufficient to force the gear shift sleeve 43 downwardly against the pressure of the springs 47 from high gear drive position to low gear drive position shown in full lines in FIG. 2 in which the small driving gear 62 engages the large back gear 61.

In order to disconnect the spindle 24 from the motor 59 for reasons pointed out below, there is provided means including another pair of air cylinders 68 also carried by the plate 63 and having their piston rods 69 abutting shoulders 70 on the bottom portions of the bearing 44. The cylinders 68 have such lengths that when pressurized, the movement of the cylinders will be sufficient to force the gear shift sleeve 43 downwardly against the pressure of springs 47 from high gear drive position to neutral position in which the back gear 61 does not engage the driving gear 62 and the teeth 49 and 50 are disengaged. This feature of being able to disconnect the spindle from the motor drive is advantageous when setting up or adjusting the positions of the parts of the spindle. Suitable valve mechanism is provided for controlling the cylinders 64 and 68 manually or automatically as will be pointed out in connection with the description of the system shown in FIG. 21.

The pairs of cylinders 64 and 68 are respectively located diametrically opposite each other, as shown in FIG. 5, to balance the force of moving the gear shift sleeve 43.

Figure 21:
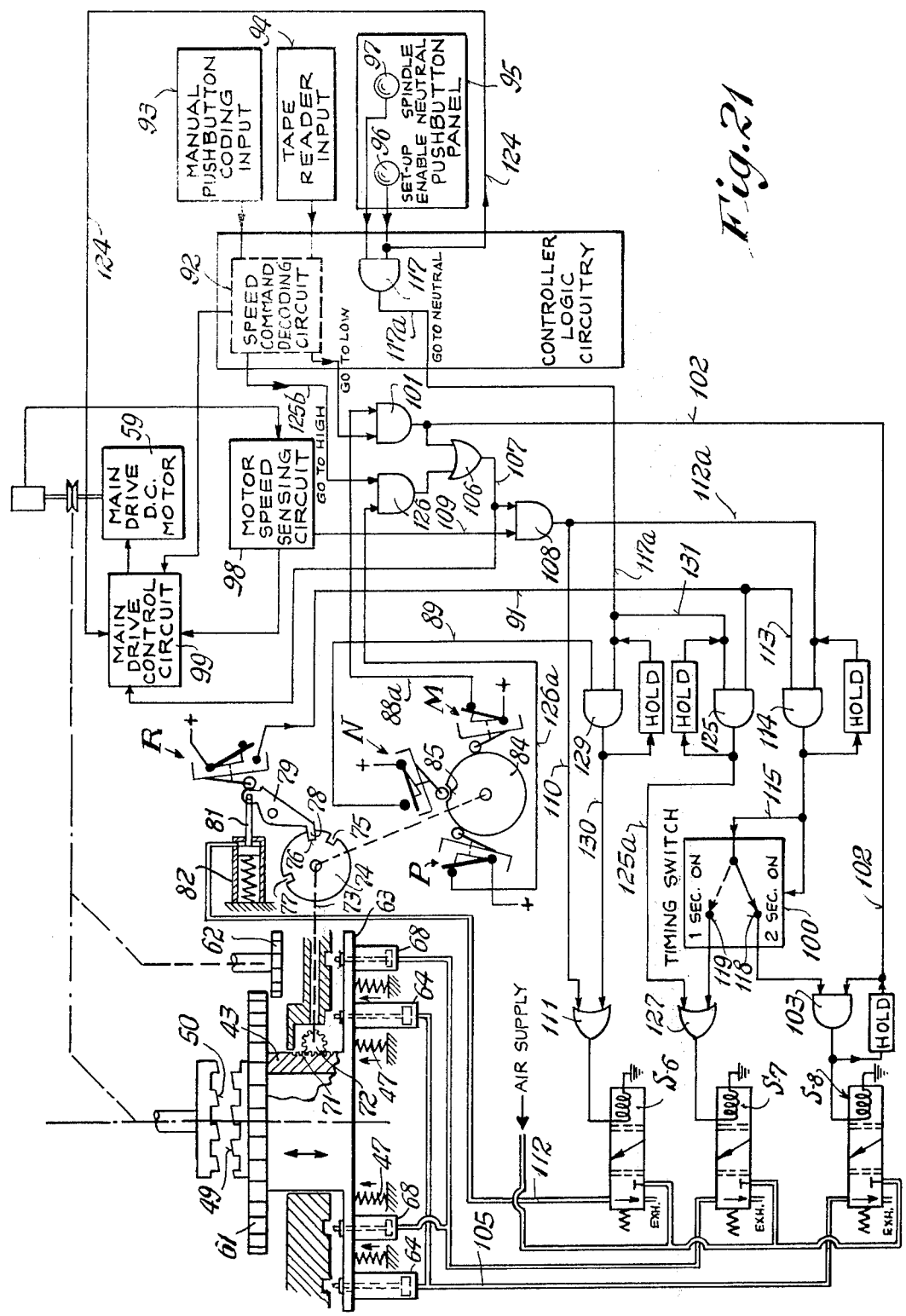
FIG. 21 is a diagram showing the electrical and pneumatic components relative to the spindle driving motor, the gear shift controls and the gear shift mechanism.

The three positions of the gear shift sleeve 43 are controlled automatically by means shown in FIGS. 2, 15, 16 and 21 in which the gear shift sleeve 43 is provided with a gear rack 71 meshing with a gear 72 secured to a shaft 73 having secured to it a locking disk 74 as shown in FIGS. 15 and 16. The locking disk 74 is provided with radial slots 75, 76 and 77 spaced around its periphery to receive a tooth 78 on a locking pawl 79 pivoted at 80 and pivotally connected to a piston rod 81 of an air cylinder 82 which is controlled by a solenoid valve 83 as shown in FIGS. 15, 16 and 21.

When the gear shift sleeve 43 is in neutral position, the tooth 78 on pawl 79 will engage the slot 76 in the locking disk 74 to lock the shaft 73 against rotation and hence the gear shift sleeve 43 against movement. When the sleeve 43 is in high gear drive position, the locking pawl tooth 78 will engage the slot 75 and when in low gear drive position the locking pawl tooth 78 will engage the slot 77, the locking pawl 79 being moved by the piston rod 81 of the cylinder 82 to cause the tooth 78 to disengage the disk 74 while the sleeve 43 is being moved by the cylinders 64 or 68, or by the springs 47 as pointed out below with reference to FIG. 21.

To coordinate the shifting of the gear shift sleeve 43 with other operations of the spindle unit as described below, a cam disk 84 secured to the shaft 73 is provided with a notch 85 to receive rollers on switches P, N and M, each of which is biased to move to open circuit position when its roller moves into the notch 85 in the cam disk 84. These switches P, N and M are wired so that they denote respectively that the sleeve 43 is not in high gear, not in neutral and not in low gear.

When the gear shift sleeve 43 is in neutral position, the roller on the switch N will enter the notch 85 in the cam 84, as shown in FIG. 21, and allow the switch N to open a control circuit including a lead 89 shown in FIG. 21, but when the cam 84 moves either to the left or the right (which occurs when the sleeve 43 is moving to either high or low gear position) the switch N is closed giving a signal to the control circuit that the sleeve 43 is not in neutral position as will be more fully explained in connection with the discussion of FIG. 21.

To sense the position of the locking pawl 79 for the purpose of determining whether or not the control shaft 73 is locked or free, there is provided a switch R, see FIGS. 15 and 21, which is released by piston rod 81 when the pawl 79 is in unlocking position and closes to energize a control circuit 91, referred to below.

SPINDLE GEAR SHIFT OPERATION

FIG. 21 which is a combination mechanical, electrical, pneumatic and control logic diagram shows the back gear 61, the clutch comprising the teeth 49 and 50, the driving gear 62, the gear shift sleeve 43, plate 63, cylinders 64 and 68 for moving the sleeve 43, and hence the back gear 61, from high gear position shown in FIG. 4 in full lines to which it is urged by springs 47, to low gear position and neutral position respectively. Also shown diagrammatically are the gear rack 71 on the gear shift sleeve 43, gear 72, shaft 73, locking disk 74 and cam 84, pawl 79 and pawl-operated switch M.

In addition to the above-named elements, the circuits shown in FIG. 21 include a speed command decoding circuit 92, a manual push button unit 93, a tape reader input 94, a push button panel 95 having a set-up enable push button 96, spindle neutral push button 97, a motor speed sensing circuit 98, a main drive control circuit 99, a timing switch 100 and leads connecting the various elements referred to below.

The sequence of gear shifting to either high or low gear may be initiated by manually inputting a speed code that requires a gear shift, or by tape command.

SHIFT-TO-LOW GEAR SEQUENCE

Assuming that the back gear is in high gear or neutral position and a go-to-low signal is given, the signal is produced by the tape reader input 94 through the motor speed command decoding circuit 92 which causes the speed of the spindle motor 59 to be reduced to 30 r.p.m. and to continue to operate at that speed during the gear shifting operation. The signal is sent through AND gate 101, lead 102 and AND gate 103 which activates solenoid valve S8 which through conduit 105 causes operation of the cylinders 64 which moves the gear shift sleeve 43 downwardly to cause the back gear 61 to mesh with the driving gear 62.

However, before this happens the AND gate 101 must be made conductive by a signal from switch M through lead 88a, that the back gear 61 is not in low gear position. Also, it is necessary that the AND gate 103 be made conductive. This is accomplished by a signal passed from the AND gate 101 to OR gate 106, lead 107 and AND gate 108 which is made conductive by a signal through lead 109 from the motor speed sensing circuit 98 which indicates that the speed of the motor has been reduced to about 30 r.p.m. The output of the AND gate 108 is passed via lead 110 to OR gate 111 which activates solenoid valve S6 and causes air under pressure to flow through the duct 112 to the cylinder 82 which then releases the pawl 79 from the locking disk 74 and frees the gear shift sleeve 43 for movement.

When pawl 79 is released, switch R is allowed to close and this sends a signal via lead 91, lead 113 to AND gate 114 which is made conductive by a signal via lead 112a from AND gate 108 which in turn had been made conductive as stated above. When thus made conductive a signal passes from AND gate 114 via lead 115 to switch blade 116 of the time switch 100. The blade 116 moves between two contacts 118 and 119.

When contact 118 is engaged by the switch blade 116, the AND gate 103 becomes conductive and activates solenoid S8 which feeds air under pressure to cylinders 64 which moves the back gear 61 to low speed position. If, when the cylinders 64 are activated and the teeth on the back gear 61 and the teeth of the driving gear 62 properly engage, the notch 85 on the disk 84 will permit the switch M to open the not-in-low signal, thus rendering the AND gate 101 not conductive which will result in the solenoid valves S6 and S8 being deactivated allowing the pawl 79 to enter the slot 77 and lock the gear shift sleeve 43 in low speed position.

Should the teeth of the back gear 61 and the driving gear 62 be out of alignment and not fully engaged after approximately two seconds, the switch blade 116 will move to disengage the contact 118. This will result in the deenergizing of the low solenoid valve S8 and the subsequent removal of air pressure and the exhausting of air from cylinders 64. At the same time switch blade 116 will engage the contact 119. This will result in the energizing of the neutral solenoid valve S7 and cylinders 68 thereby causing the teeth of the back gear 61 and driving gear 62 to separate and assume a different relative tooth alignment due to the continued slow rotation of the motor 59. After the gears have been disengaged for one second, the switch blade 116 is shifted back to the contact 118 and the solenoid valve S8 and the cylinders 64 make another attempt to cause the teeth 61 and 62 to engage.

This engagement and disengagement cycle is repeated every three seconds, as described above, while the back gear 61 is rotating slowly until the teeth of the gears mesh and this is indicated by the actuation of the switch M which, as above stated, signals the end of the gear shift cycle.

SHIFT-TO-HIGH GEAR SEQUENCE

Since the gear shift sleeve 43 is normally urged to high gear position in which the teeth 49 and 50 are caused to be engaged by springs 47, it is merely necessary to operate the cylinder 82 to release the latch 79 from the locking disk 74 and allow the springs 47 to raise the back gear 61 to high gear position.

To release the latch 79 the Go-To-High lead 125b passes a signal to AND gate 126 which is made conductive by the switch P which is closed when the gear shift sleeve 43 is not in high gear position. When conductive the AND gate 126 sends a signal to OR gate 106 and lead 107 to AND gate 108. The latter gate 108 is made conductive by the lead 109 from the motor speed circuit 98 and when conductive a signal is passed by AND gate 108 through lead 110 to OR gate 111 and solenoid valve S6 which feeds air under pressure to the cylinder 82 which releases the latch 79 and allows the sleeve 43 to move the back gear to high gear position.

At the same time that a signal is sent from AND gate 108 to OR gate 111 to release the latch 79, a signal is sent by AND gate 108 via leads 112a and gate 114 to the time switch 100. Gate 114 is rendered conductive by a signal via lead 91 when the switch R is closed by the release of the latch pawl 79.

Should the teeth 49 and 50 be out of alignment and not fully engaged after approximately two seconds, a neutral solenoid valve S7 will be energized as a result of the timer switch 100 when its switch blade 116 moves to contact 119. This will result in the pressurizing of cylinders 68 thereby allowing the teeth 49 and 50 to separate and assume a different relative tooth alignment as the teeth continue to rotate slowly. This disengagement takes place for about one second, then the neutral gear solenoid valve S8 is deenergized once again allowing the teeth of the clutch to mesh.

This engagement and disengagement cycle is repeated every three seconds, as described above, until the teeth 49 and 50 engage which is indicated by the opening of the not-in-high gear signal from switch P. When this occurs, the pawl operating cylinder 82 is deenergized, thereby allowing the pawl 79 to fall into the slot 75 of the locking disk 84 so that the gear shift sleeve 43 is locked in high gear position. At this time, the pawl-operated switch R will be moved to open circuit position, thereby signaling the end of the gear shifting cycle.

SHIFT-TO-NEUTRAL GEAR SEQUENCE

Assuming that the back gear 61 is in low gear or high gear position and a G0-To-Neutral signal is given; this signal is produced by first pressing the "Set-up Enable" push button 96 and then pressing the Spindle Neutral push button 97 on the control panel 95. In this case the spindle drive motor 59 is stopped by operation of the push button 96 which opens the circuit including lead 124 to the Main Drive Control Circuit 99 to stop the motor 59. The actuation of the push button 97 results in sending a signal via AND gate 117, lead 117a to AND gate 129, made conductive by lead 89 from the not-in-neutral switch N, and lead 130 to OR gate 111 which activates solenoid valve S6 to operate cylinder 82 to cause the latch 79 to release the locking disk 74 and thus the gear shift sleeve 43 for movement. At the same time via lead 131, which is connected to lead 117a, AND gate 125, lead 125a and OR gate 127 energize solenoid valve S7 which allows air under pressure to flow to the cylinders 68 which limits the upward movement of the gear shift sleeve 43 under the influence of the springs 47, if the back gear 61 had been in low gear position, or returns the back gear to neutral position if the back gear had been in high gear position.

When the back gear is in neutral position, the "in neutral" switch N is moved to open position. This causes the AND gate 129 to be non-conducting, causing the deenergization of the release gear latch solenoid valve S6 thereby allowing the latch 79 to fall into slot 76 of the locking disk 74 to lock the gear shift sleeve in neutral. When the latch is in place, the latch switch R will be opened. This will result in the deenergization of the neutral gear solenoid S7 and will also signal the end of the gear shifting cycle.

DRAWBAR

Heretofore, it has been suggested that a tapered toolholder be drawn into tight engagement with a tapered socket of a spindle by hooks on the end of a drawbar engaging an adapter on the toolholder and that there be camming means operative as a result of the movement of the drawbar relative to the spindle for moving said hooks to a position clear of the adapter and allow the toolholder to be removed from the spindle socket. This required an adapter of special construction and also required the drawbar to have an excessively long stroke. Thus the maximum force capability of the retracting spring was limited and a smaller portion of that force was available for the primary function of the drawbar, holding the tapered toolholder in the tapered socket.

These disadvantages have been obviated by the present invention by providing for withdrawing the adapter hooks from the adapter independently of the pulling force of the drawbar, so that it is merely necessary to move the drawbar slightly, to take the pressure of the hooks off the adapter, and then move the hooks away from the adapter by separate means, the operation of which requires comparatively little power.

In the form of this invention herein disclosed, within the spindle 24 there is a drawbar 140, the lower enlarged end 141 of which fits in a cavity 142 in the lower end portion of the spindle 24 into which the toolholder 26 having an adapter 143 extends when the toolholder 26 is seated in the tapered socket 25. The lower end 141 of the drawbar 140 has elongate slots 144, see FIG. 10, forming fingers 145, each having a notch forming a hook 146 positioned to receive and externally engage the head 147 of the adapter 143 secured to the top of the tapered toolholder 26 when the latter is inserted in the tapered socket 25 at the end of the spindle.

The fingers 145 are resilient and are biased to move inwardly so that finger hooks 146 extend into an annular groove 146a in the adapter forming an annular shoulder 148 on the adapter to be engaged by finger hooks 146 on the fingers 145, as shown in FIG. 3. After a toolholder 26 has been placed in the socket 25, control apparatus referred to below is actuated to cause the drawbar 140 to be pulled inwardly of the spindle and this movement seats the toolholder snugly in the nose of the spindle.

For this purpose, there is provided a powerful drawbar spring 149 which may comprise a stack of Belleville disks which are carried within an extension sleeve 150 of the spindle 24 and surround the drawbar 140. One end of the spring 149 engages the upper end 151 of the spindle proper, while the other end engages a nut 151a threaded on the drawbar 140 and establishes a powerful upward thrust of the drawbar.

As stated above, it has been proposed to lock the drawbar hooks in engagement with a toolholder adapter as an incident to the movement of the drawbar in one direction, and to unlock and withdraw the drawbar hooks by a movement of the drawbar in the opposite direction. However, to so control the drawbar hooks required a substantial movement of the drawbar against the force of the powerful drawbar spring to overcome the pressure, and friction produced thereby, of the hooks on the adapter, and a further movement of the drawbar to move the hooks clear of the shoulder 148 on the adapter.

This required a large movement of the drawbar to first release the grip of the hooks on the adapter and then with additional displacement to disengage them by a camming action, thereby allowing the toolholder to be removed from the spindle. Fundamental to the design of the quill type vertical milling machine is the fact that the space available for the drawbar springs is limited both in length and diameter. This limits the amount of spring material and the energy which may be stored in these springs when stressed to the greatest possible level. The energy stored in a typical spring stack is proportional to the displacement from free height multiplied by the maximum force level. Thus where the amount of spring material is limited by space requirements the shorter the stroke required of the spring stack the greater the maximum force level available from it.

In the present invention the maximum drawbar pull is made available to retain the toolholder in the spindle taper by providing for withdrawing the finger hooks 146 from the adapter 143 independently of the pulling force of the drawbar 140, so that it is only necessary to move the drawbar slightly, to take the pressure of the finger hooks 146 off the adapter 143, and then move the finger hooks 146 away from the adapter by separate means, the operation of which requires comparatively little power.

According to the present invention the power for moving the drawbar 140 against the force of the drawbar spring 149 is derived from air under pressure passing through solenoid valve S2 acting on a primary diaphragm 152 which has a diaphragm plate 153 supported on weight-counterbalancing springs 154. The diaphragm plate 153 is preferably concentric with and directly above the upper end 155 of the drawbar 140 and has a flanged bushing 156 which, when the diaphragm 152 is depressed applies force to the upper end of the drawbar 140 to move the latter downwardly against the force of the heavy spring 54 until bushing 156 bottoms on the upper end of the spindle 157. Drawbar 140 is moved just far enough to move the finger hooks 146 away from the annular shoulder 148 of the adapter and thus relieve the pressure of the finger hooks on the adapter, see FIGS. 2, 9, 12 and 13.

To avoid the pressure on the drawbar 140 loading the spindle bearings and causing the spindle 24 to move downwardly and not produce the desired relative movement between the drawbar 140 and spindle, the upper end 157 of the spindle, which projects above the support 11, is provided with an annular groove 158, and there is a spindle-restraining ground plane plate, herein referred to as locking plate 159, which is pivotally mounted on the horizontal support 11 of the framework and has an arcuate slot 160, the edges of which engage the shoulder of the groove 158 when the locking plate 159 is swung into the spindle groove 158 and thereby holds the spindle 24 against downward movement. A circular hole 161 (see FIG. 7) in the locking plate 159 is large enough to permit the upper end 157 of the spindle 24 to pass through the plate 159 when the spindle is advanced from and returned to the upper limit of its movement.

The locking plate 159 is operated by a cylinder and piston S1, see FIGS. 7 and 19, under the control of tool ejection means described below. The extent of downward movement of the locking plate 159 and the spindle 24 is controlled by a bushing 153a in the support 11 which is precision formed to accurately locate the locking plate 159 and hence the spindle relative to the related parts in the spindle unit.

When the primary diaphragm plate 153 is activated by air under pressure passing through solenoid valve S2, the drawbar 140 will be depressed a slight amount which, according to the present invention, need be only sufficient (in the order of 0.100 in. and obviously is exaggerated in FIG. 9) to relieve the pressure of the finger hooks 146 from the head 147 of the adapter 143 as shown in FIG. 12.

After this occurs, a secondary diaphragm plate 163, carried by a secondary diaphragm 164 which is secured to and carried by the diaphragm plate 153, is activated by air under pressure passing through solenoid valve S3 and tube 163a to move downwardly causing a pin 165 (see FIGS. 5 and 9), slidably mounted in the flanged bushing 156 in the diaphragm plate 153, to engage and depress a push rod 166 which extends through the drawbar 140 and into a cavity 167 at the lower end of the drawbar 140.

The lower end 168 of the push rod 166 carries a finger locking and releasing head 169 shown in FIGS. 10 and 11 for locking and releasing the adapter gripping finger hooks 145.

The pin 165 actuates the push rod 166 against the force of a relatively light coil spring 170 which engages a lock nut 171 on the drawbar 140 and the other end lies in a cup 172 which is slidably mounted on the drawbar and has operative engagement with a cross pin 173 mounted in the push rod 166. The drawbar has a transverse slot 174 permitting the necessary longitudinal movement of the cross pin 173 relative to the drawbar.

The locking and releasing head 169 on the push rod 166 has four depending bars 175, see FIGS. 10 and 11, located in the slots 144 between drawbar fingers 145. At their lower ends the bars 175 are connected to a ring 176. Extending upwardly from the ring 176 is a locking ring 177 having inclined surfaces 178 to engage inclined surfaces 179 and lock the fingers 145, as shown in FIGS. 3 and 8, against being moved away from and releasing the adapter 143, in which position the spindle is prepared for operations.

In addition to the head 169 which carries the locking ring 177, the push rod 166 has a cam 180 which lies in a space between the fingers 145 and has a downwardly tapering surface 180', positioned when the push rod is in depressed position, to be engaged by cam surfaces 181 on the fingers 145 so as to push the fingers outwardly when the drawbar returns to the position shown in FIG. 13 in which the hooks 146 are clear of the shoulder 148 on the adapter. The cam 180 has a concentric portion 183 which holds the fingers spread apart until the push rod is retracted as shown in FIG. 13.

In order to avoid the tapered end of the toolholder from clinging to the tapered socket of the spindle when the adapter is released by the finger hooks, the stroke of the push rod 166 is such that a portion of the head 169 of the push rod or the end of the push rod will strike the end of the head 147 of the adapter 143 and loosen the toolholder so that it will fall out of the spindle socket.

TOOL CHANGING

The operation of changing tools on the spindle whether under manual or automatic control requires that the spindle 24 be in fully retracted position and this is determined by the upper limit switch 121 positioned to be actuated by means of a plate 122 carried by the quill 21. The switch 121, in addition to other functions, interrupts the operation of the spindle rotating motor 59, and the quill motor 37 as explained below. Below the switch 121 there is a deceleration switch 121a which causes the speed of the quill motor 37 to be reduced as the quill approaches the upper limit of its movement.

TOOL EJECTION

Referring to the diagram (FIGS. 19 and 20) it will be assumed that the spindle 24 contains a toolholder and that the quill 21 and spindle 24 are in their uppermost positions shown in FIG. 20 in which the upper limit switch 121 has been closed by engagement with the quill plate 21a thereby closing a circuit including a source V of direct current, 24 volts for instance, and that a switch B has been closed when the spindle rotating motor 59 was stopped; when the tool eject switch TR is closed, current from the positive pole of the current source V will flow through line L1 to energize solenoid valve S1 which is connected by leads L2 to the negative return line N of the current source V. This will cause the piston 162 in the cylinder 162a to move the ground plane locking plate 159 to position to lock the spindle 24 in "up", i.e., retracted position. When the plate 159 moves to locking position, switch C which is connected to line L1 by line L3, closes a circuit including line L4, diode D' and line L5, solenoid valve S2 to line L6 leading to the negative return line N. This energizes solenoid valve S2 which supplies air under pressure through the port 152a to the plate 153 of the primary diaphragm 152 which moves the drawbar 140 slightly (in the order of about 0.100 inch) against the force of the drawbar springs 149 to take the pressure of the finger hooks 146 off the shoulder 148 of the toolholder adapter 143 as stated above.

Figure 7:
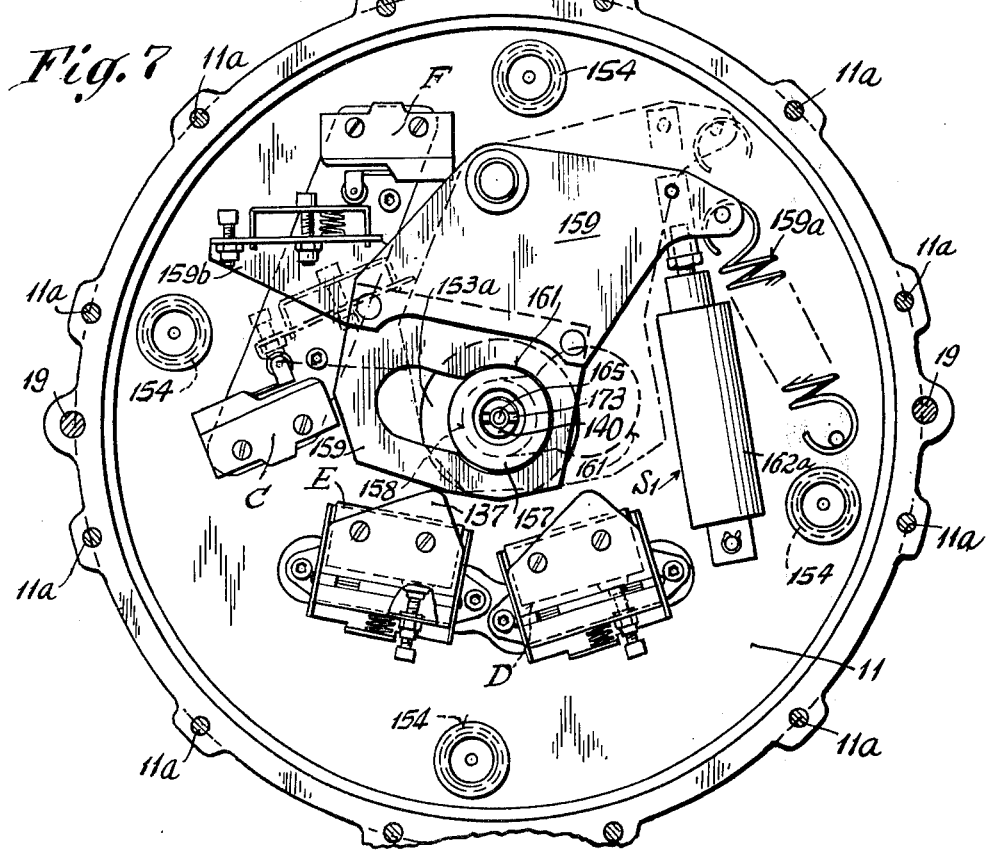
FIG. 7 is a plan view of the base of the dome portion of the spindle unit showing the spindle locking plate, herein sometimes called the ground plane plate, and the means for operating it, including the switches operated by the plate and by the primary diaphragm plate.
Figure 17:
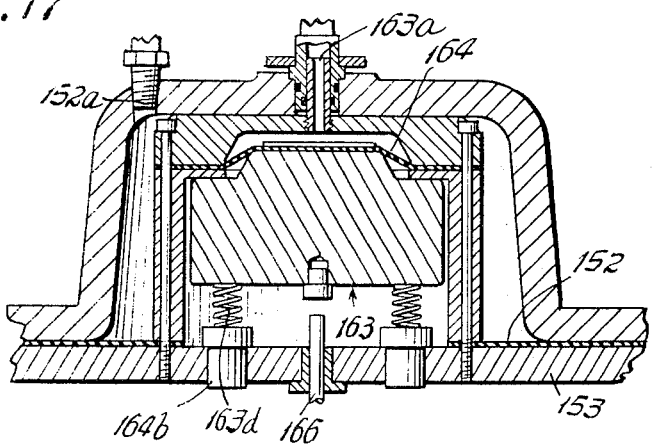
FIG. 17 is a sectional view of a modification of the dome for the spindle shown in FIG. 1 in which the secondary diaphragm carries a large block of metal which is capable of applying a hammer blow to the push rod when the secondary diaphragm is activated.
Figure 18:
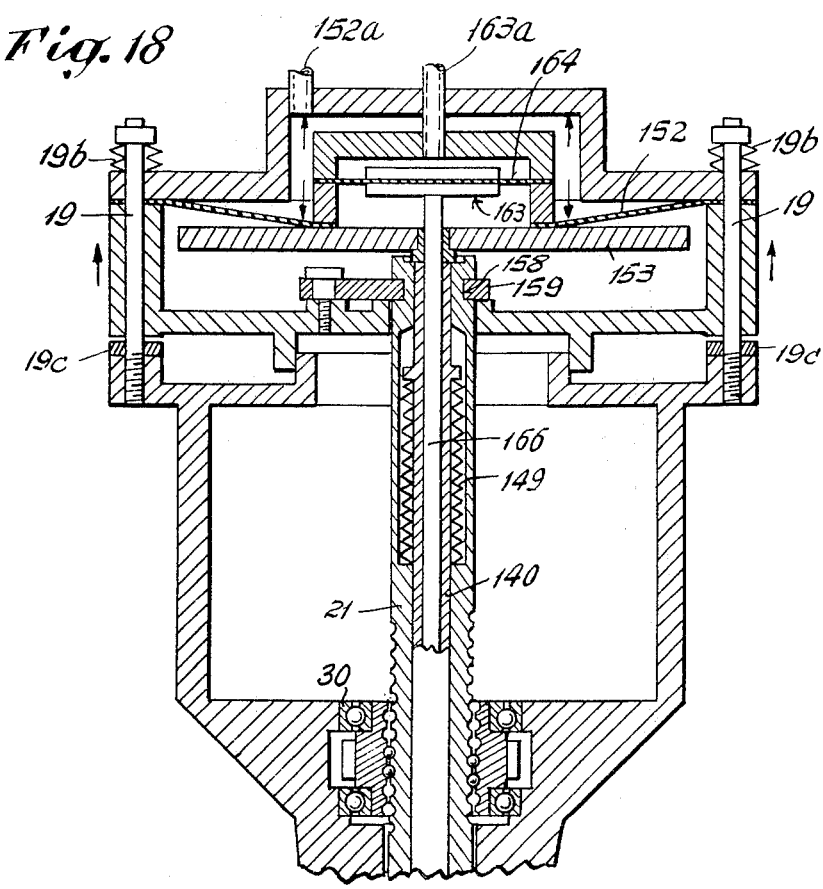
FIG. 18 is a diagrammatic sectional view of the diaphragm for operating the drawbar and push rod showing the means for absorbing the shock applied to the spindle and quill when the diaphragm plate strikes the drawbar and spindle.
Figure 19:
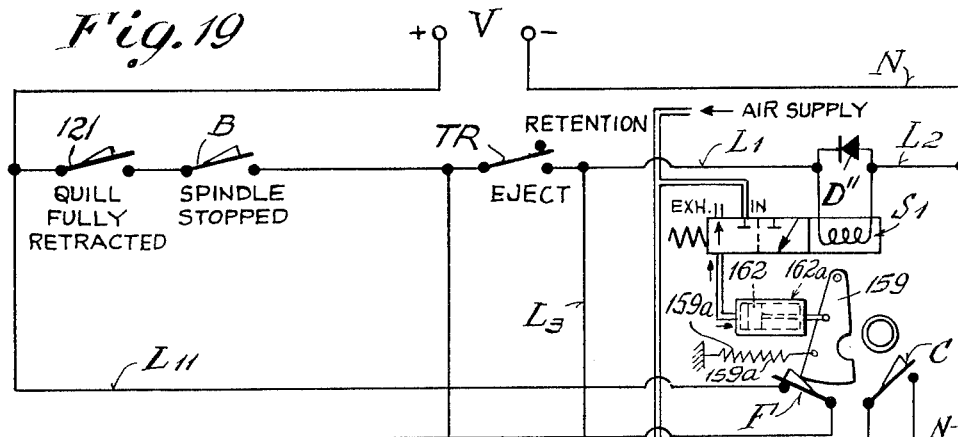
FIG. 19 is a diagram showing the electrical and pneumatic components relating to the drawbar and push rod operating mechanism.

When the primary diaphragm plate 153 has been thus operated, a button 133 thereon, see FIGS. 7, 14a and 19, operates the switch D connected to the lead L4 to close a circuit including lead L7 to a solenoid valve S3 which supplies air under pressure to the secondary diaphragm plate 163 through a sliding tube 163a. When thus pressurized, the secondary diaphragm plate 163 operates the push rod 166 to unlock the drawbar fingers 145 and cause them to move clear of the adapter on the toolholder and to strike the top of the adapter to free the toolholder from the spindle so that it may drop into the hand of the operator or be taken by a mechanical hand when the spindle is used with a tool changing machine.

At the beginning of the stroke of the secondary diaphragm plate 163, a switch E mounted on the support 11 is operated to close a holding circuit including positive lead L8, lead L9, lead L5 to solenoid valve S2 and lead L6 connected to the negative lead N so that the solenoid valve S2 will remain energized and the primary diaphragm plate 153 depressed until after the secondary diaphragm plate 163 has been depressurized and the push rod 166 is once again returned to the normal finger-locking position relative to the drawbar. This assures that the finger hooks 146 will be closed around the toolholder of the next tool to be used before the pulling force of the Belleville springs 149 is applied to the toolholder through the medium of the drawbar and hooks.

It should be noted at this point that the switch E is mounted directly on the support 11, see FIG. 14, and has a pivoted lever 137 positioned to be engaged by a pin 139 (which projects through an aperture in the primary diaphragm plate 153) that is mounted on a leaf spring 139a carried by the plate 153. The pin 139 is so positioned as to not engage the lever 137 of the switch E (see FIG. 14) when the plate 153 is moved downwardly, but is held up when the plate 153 descends since the leaf spring 139a is supported by a shoulder of pin 165, which at this time is brought into contact with the push rod 166 and subsequently supported by push rod 166 as plate 153 continues to descend.

When the secondary diaphragm 164 is pressurized and its plate 163 descends, the pin 165 moves downwardly and permits leaf spring 139a to descend, which forces the pin 139 to engage the lever 137 and move the switch E to closed position.

The parts stay in said positions with the holding circuit switch E closed and with the finger hooks 143 on the drawbar released as shown in FIG. 13 until the current feeding the switch E is interrupted as by shutting down the machine, for instance, or when a new tool is inserted into the spindle and solenoid valve S3 is deenergized to release the secondary diaphragm 164, raise the push rod 166 to engage the hooks and subsequently lift pin 165 to raise leaf spring 139a. At this time the switch E opens the holding circuit including lead L9 to the solenoid valve S2 for the primary diaphragm 152 which allows the drawbar to rise and draw the tool into the spindle. At the same time the circuit to the solenoid valve S1 is opened depressurizing the cylinder 162 and causing the ground plane locking lever 159 to disengage the spindle and close the switch F.

Switch F is activated by the ground plane locking plate 159 when the latter is fully withdrawn from engagement with the spindle 24 as shown in FIG. 7 and closes circuits leading to the spindle rotating motor 59 and the quill operating stepping motor 37. The switch F also serves to indicate that the tool change cycle is complete and that the power drawbar is in tool retention position.

TOOL RETENTION SEQUENCE

Before a toolholder can be inserted in the spindle 24, the mechanism, including the toggle switch T must be in "eject" condition in which the finger hooks 145 are in position to engage the adapter on the toolholder. The toolholder is inserted in the nose of the spindle and firmly supported there. Then the toggle switch TR is placed in "retention" position (see FIG. 19) in which it opens the circuits to the solenoid valves S1 and S3 and permits them to exhaust. The solenoid valve S1 will remove the pressure from the cylinder 162a that holds the spindle 24 engaged with the ground plane lever 159, but the latter remains engaged with the spindle 24 because it is mechanically held there by the pressure imposed by the primary diaphragm 152 and plate 153. Solenoid valve S3 will exhaust the secondary diaphragm 164, thereby allowing the push rod 166 to rise, releasing the finger hooks 146 so that they may spring inwardly and engage the adapter on the new toolholder and continue upward causing the ring 177 to lock the fingers 146 in adapter holding position shown in FIG. 8.

When the finger hooks 145 are fully engaged with the toolholder, the push rod 166 will have returned to its initial position where it will open switch E which will result in deactivating solenoid valve S2 removing pressure from the primary diaphragm 152. When this occurs the force on the expanding Belleville springs 149 is released allowing the springs 149 to apply their force on the drawbar 140 which pulls the toolholder inwardly of the spindle and tightly holds it there.

When the force of the Belleville springs 149 is transferred to the toolholder, it is removed from the spindle ground plane plate 159 which is then free to be returned by its spring 159a to unlocking position in which switch F is closed to activate a signal via leads L10 and L11 to indicate the completion of the tool retention cycle of operations, see FIG. 19.

When the spindle is used with automatic tool changing mechanism such as disclosed herein, the switch F (see FIG. 19) is included in a circuit indicating that the tool change operation has been completed and initiating operation of the spindle.

When the spindle of the present invention is used with a machine tool in which the toolholders are inserted in and removed from the spindle manually, the closing of the switch F may enable circuits which initiate the operation of the motor 59 for rotating the tool and the stepping motor 37 for operating the quill, as will appear below.

It is convenient, as shown in FIG. 7, to mount the switches C, D, E and F on the support 11 of the bonnet under the diaphragm plate 153. The switch D is operated by a button 133 on the diaphragm plate 153 and the switches C and F are operated by the ground plane locking plate 159. The operation of switch E has already been explained in detail above.

TOOL STORAGE AND TOOL TRANSFER

As shown in the accompanying drawings (FIGS. 22, 24 and 25), the tool storage and transfer device of the present invention comprises a supporting frame 210 which can be mounted on the floor but, preferably is attached to the column 211 of the machine tool with which it is used, such as, for instance, a drilling or milling machine having a vertical spindle 24 (see FIGS. 1, 2, 3, 22 and 27) mounted in the spindle housing and provided with a nose 213 having tapered socket 25 for receiving and holding the tapered toolholder 26 of a work-performing tool T.

Figure 42:
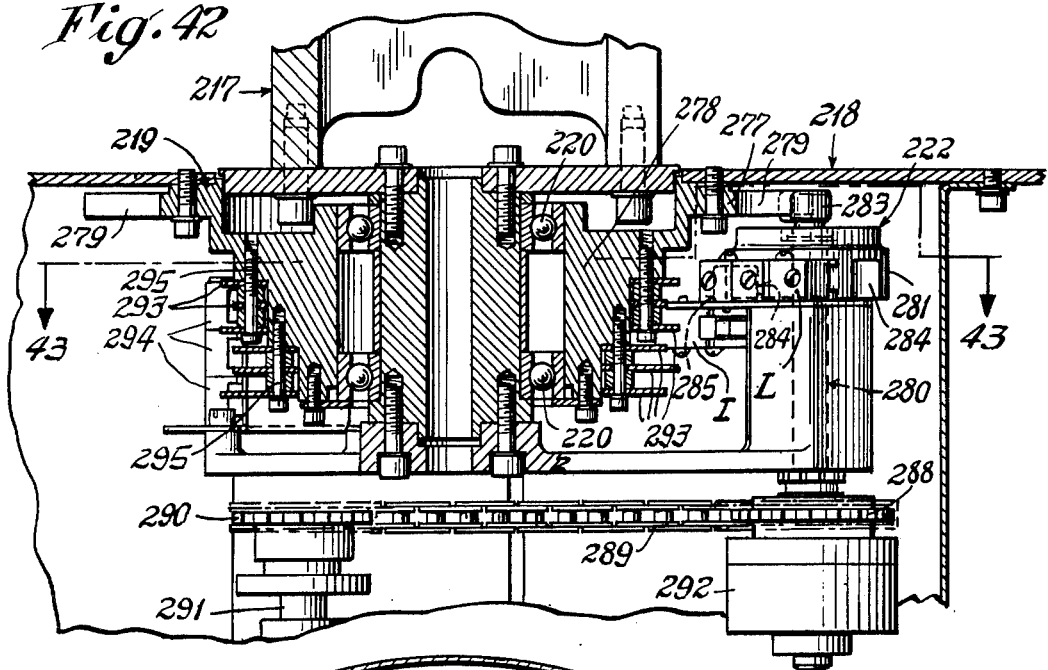
FIG. 42 is a vertical sectional view showing the turntable mounting means for the storage rack and indexing means, and the cams movable therewith for controlling binary circuits by which the turntable and rack are caused to position a toolholder selected, by programming means, in position to be picked up by the toolholder grasping hand.

The main frame 210 has a portion 217 (see FIG. 22) for supporting a toolholder storage means referred to herein as a tool rack 218 which, in the broader aspects of this invention, may be any suitable or well known form of storage means, but which, as shown, includes a generally circular turntable 219 mounted for rotation in a horizontal plane on bearings 220 on the portion 217 of the frame (see FIG. 42).

The tool rack 218 has in its peripheral edge a plurality of equispaced U-shaped slots forming sockets 221, each adapted to receive and hold the toolholder of a particular working tool. The tool rack 218 is rotated by indexing mechanism 222 under control of programming apparatus as explained below.

Supported by the main frame 210 there is an elongate arm 223 which extends from the tool rack 218 into close proximity with the spindle 24. The arm 223 comprises a vertical bar 224 secured to a horizontal plate 225, the latter forming tracks 226 for supporting and guiding a toolholder carriage 227 having wheels 228 engaging the top surfaces of the plate 225, wheels 229 engaging the bottom surfaces of the plate 225 and rollers 229' engaging the side edge of the plate 225 so that the toolholder carriage 227 will be suspended from the arm 223 but will be prevented from swinging or moving laterally thereon.

The arm 223 extends horizontally from the tool rack 218 toward the spindle housing 210a of the machine tool as shown in FIG. 22 at a level substantially above that of the nose 213 of the spindle so that the arm 223 will not interfere with the operation of the machine tool. For the same reason the delivery end 223a of the arm 223 is spaced horizontally from the spindle housing 210a and the carriage 227 has a horizontal mechanical hand 230 which extends forwardly to underlie the spindle 24 when the arm 223 and carriage 227 are in position to remove a toolholder from the spindle and deliver another toolholder to the spindle.

The vertical bar 224 of the arm 223 has fixed to it a bracket 224a, see FIGS. 22 and 24, which is fixed on a shaft 231 pivotally mounted in bearings 231a carried by the main frame 210. Extending from one end of the bracket 224a is a plate 232 carrying a roller 233 which rides in a groove 234 of a box cam 235 fixed on a shaft 236 rotatably supported by the main frame 210 (see FIG. 24) and driven by a reversible electric motor AM through a sprocket wheel 236a on the motor shaft 236b and sprocket chain 236c and sprocket wheel 236d mounted on the shaft 236 to drive the latter through a slip clutch arrangement referred to below.

When the roller 233 is in the concentric portion 237 of the groove 234, the arm 223 is held substantially horizontal by the box cam 235 but, when the inwardly sloping cam portion 238 and the outwardly sloping portion 239 engage the roller 233 on the plate 232, the arm 223 and the tool transporting carriage 227 thereon will pivot with the horizontal shaft 231 causing the distal end 223a of the arm 223 to swing downwardly and then upwardly to insert the toolholder 26 into the socket 25 of the spindle 24 of the machine tool as explained below.

The tool rack 218 has a plurality of equispaced, U-shaped rack sockets 221 to receive toolholders 26 and hold them in vertical position with the flanges 260 on the toolholder resting on the edge portions 221a of a rack socket 221. To releasably hold the toolholder 26 in the rack socket 221 against being accidentally thrown out of the socket, for instance by centrifugal force when the rack 218 is rotated when indexing, there is mounted, as shown in FIG. 24, on each side of each socket 221 a post 260a over which the toolholder is lifted, as explained below, to engage the flange 260 of the toolholder and retain it in the socket.

To move the carriage 227 along the arm 223 from its position of rest over the tool rack 218 to the spindle 24 and back to the rack 218, the carriage 227 is connected to an endless sprocket chain 241 which extends around a sprocket wheel 242 under an idler sprocket wheel 243 rotatably mounted on the bar 224 of the arm 223, then around a sprocket wheel 244 which is rotatably mounted on the end 223a of the arm 223 and from the sprocket wheel 244 back to the carriage 227 to which it is fastened at 245, and back to the sprocket wheel 242 which is rotatably mounted on a shaft 246 fixed to the bracket 224a carried by the vertical bar 224 of the arm 223.

To drive the sprocket wheel 242 in opposite directions to advance and retract the carriage 227 without using shiftable gears and for the purpose of accelerating and decelerating the speed of travel of the carriage 227 as it leaves and approaches respectively its terminal positions on the arm 223, the sprocket wheel 242 is secured to a gear 248 positioned to be engaged by a gear rack 249, one end of which is pivotally connected by a rod end bearing 249a to a crank arm 250 secured to the box cam 235 which is driven by the shaft 236 to which the reversible motor AM is connected. The gear rack 249 is held in engagement with the gear 248 by a retainer 251 pivoted on a shaft 246 and having a pair of spaced rollers 252 engaging the flat back surface 253 of the gear rack 249.

Referring to FIGS. 22, 24 and 27, the carriage 227 has a depending portion 254 from which the toolholder grasping mechanical hand 230 extends horizontally. The forward end of the hand 230 has a U-shaped socket 256, the edge portions 257 of which are spaced to be received in an annular groove 258 formed between flanges 259 and 260 on the toolholder 26. The edge portions 257 have inclined ends 257a and the tops thereof are tapered at 257b to guide the toolholder into the hand socket 256.

As shown in FIGS. 32 and 33, on the underside of the toolholder hand 230 there are mounted fingers 261 pivoted at 262 and having toggle links 263 connected to a link 264 which in turn is pivotally connected to a bellcrank 265 pivoted at 265a. Springs 266 connected to the toggle links 263 are biased to resiliently urge the hook-like ends 267 of the fingers 261 toward each other. When extended into the annular groove 258 of the toolholder 26, the ends 267 of the fingers 261 engage the bottom of the groove 258 at points beyond its diameter and releasably hold the toolholder in the socket 256.

The bellcrank 265 engages a pugh rod 268 which is slidable vertically in bearings in the dependent portion 254 of the carriage 227 to cause the fingers 261 to grasp or release the toolholder when operated. As will be explained more fully below, when the carriage moves toward its terminal positions, the push rod 268 is depressed and the fingers 261 are moved to toolholder-releasing position.

TOOL TRANSFER OPERATION

Assuming that work with the tool T in the spindle has been completed, that the spindle is fully retracted and that, if necessary, the workpiece and worktable have been moved out of the way, the motor AM is started to rotate the shaft 236 and the box cam 235 clockwise. As the crank arm 250 rotates clockwise from the position shown in FIGS. 22, 34 and 35, the gear rack 249 will be pulled downwardly and toward the left causing the gear 248 to rotate the sprocket wheel 242 counterclockwise and advance the carriage, slowly during the first 45° of movement of the crank arm 250 as the pivot pin 249a moves from approximately dead-center position as shown in FIG. 34. As the crank arm 250 continues to rotate for approximately the next 90° the speed of the carriage 227 is gradually accelerated and then is decelerated during the next approximately 45° until the crank arm reaches a position shown in FIG. 35 in which the empty mechanical hand 230 on the carriage in raised, i.e., horizontal, position reaches the spindle. As this occurs the push rod 268 on the carriage engages a cam surface 269 (FIGS. 22 and 27) on the abutment 270 and is depressed to reverse the toggle links 263 on the mechanical hand 230 and allow the hook-like ends 267 of the fingers 261 and the edge portions 257 to move into the groove 258 of the toolholder.

The abutment 270 is pivotally mounted on the end 223a of the arm 223 and is pivotally connected to a rod 270a which projects upwardly through the bushing 270b under the influence of the springs 270c and has its upper end positioned to engage the stop screw 270d, carried by a portion of the machine tool frame, when the arm is in horizontal position.

When the empty hand reached the spindle, a switch G operated by a cam G' on the shaft 236 is closed and this activates toolholder ejecting means decribed above to release the toolholder 26 from the spindle drawbar and deposit the toolholder on the mechanical hand 230.

While the box cam 235 and crank arm 250 are still rotating, the inwardly inclined portion 238 (FIGS. 35–36) of the cam 235 causes the adjacent end 223b of the arm 223 to rise and the other end 223a of the arm 223 to be lowered to withdraw and release the toolholder 26 from the spindle socket 25. As this is taking place the rod 270a moves away from the stop screw 270d allowing the abutment 270 to swing upwardly thereby permitting the push rod 268 to rise and reverse the position of the toggles 263 and allow the springs 266 to cause the fingers 261 to grip the toolholder 26.

As the box cam 236 continues to rotate, the outwardly sloping portion 239 of the box cam causes the end 223a of the arm to rise to assume the normal horizontal position shown in FIG. 22.

As the shaft 236 of the crank arm 250 continues its rotation, the acceleration and deceleration of the carriage will be approximately the same as it was when the carriage traveled to the spindle, but the pivot 249a having passed over the dead-center line, see FIG. 35, the direction of movement of the gear rack 249 will be toward the right, as shown in FIGS. 36 and 37, reversing the direction of rotation of the gear 248 and the sprocket wheel 242 which returns the carriage with the used toolholder to the tool rack 218, the cam 235 and rack 218 being in the position shown in FIG. 38 without any gear shifting operation having taken place.

Thus a substantial saving in the cost of manufacturing the device is obtained and the speed of travel of the carriage may be increased without the danger of damaging the parts when the carriage reaches its terminal positions shown in full lines respectively in FIG. 22.

When the carriage 227 with the used toolholder therein reaches the tool rack 218, push rod 268 on the carriage 227 engages a cam 273 on the arm 223 and is depressed thus causing the position of the toggle links 263 to be reversed and the fingers 261 on the hand 255 to release the toolholder.

However, before this happens the edges 221a of the socket 221 will have entered the space 258a under the flange 260 of the toolholder, and the flange 260, as shown in FIG. 24, will have passed over the buttons 260a on the rack. The arm 223 is then lowered slightly by the cam follower 233 engaging projection 272 on the box cam 235. This lowers hand 230 allowing toolholder 26 to come to stop with flange 260 supporting the toolholder on tool rack 218.

After this has been done the carriage 227 moves toward the center of the rack 218 to a position in which it is clear of the circular row of toolholders therein and the cam J' on the shaft 236 opens the switch J to stop the motor AM.

When the carriage 227 reaches its terminal position over the tool rack, cam K' on the shaft 236 closes the switch K which energizes the tool rack motor RM to operate and index the rack 218 to bring the next tool to be used in front of the hand 230 on the carriage, as explained below. After the rack has been indexed the arm and carriage driving motor AM is caused to rotate, but in the reverse of its previous direction, as explained below causing the crank arm 250 and cam 235 to rotate counterclockwise, as shown in FIG. 39. This reverses the direction of the gear rack 249 and pinion 248 and causes the carriage to move toward the spindle with the new tool in the mechanical hand 230.

As the carriage 227 starts to move, the socket edges 257 of tool hand socket 256 enter the upper groove 258 of the toolholder 26. As box cam 235 rotates, cam follower 233 leaves projection 272 causing the hand to lift the toolholder from the surface of the rack as it is moved out of the rack socket 221. Thus the toolholder is lifted over posts 260a as it leaves the tool rack. At the same time the push rod 268 on the tool carriage 227 rides off the cam 273 allowing toggle links 263 to reverse their position and cause fingers 261 to engage and grasp the new toolholder in the hand.

The continued rotation of the box cam 235 and movement of the rack bar 249 causes the carriage with the toolholder to travel along the track until, as the carriage approaches the spindle, the offset cam portion 239 of box cam 235 engages the roller 233 on the adjusting plate 232 (see FIG. 40), and causes the end 223a of the arm to swing downwardly, as shown in FIG. 22 in dotted lines, in which position the adapter 143 on the upper end of the toolholder is clear of the nose 213 of the spindle 24 and may pass under it. Then, when the offset portion 238 of the box cam 235 engages the roller 233, the end 223a of the arm 223 and the carriage 227 with the hand 230 swing upwardly inserting the toolholder in the spindle as shown in dot and dash lines in FIG. 22.

When arm 223 raises to insert toolholder 26 in spindle socket 213, push rod 270a comes in contact with stop screw 270d pushing push rod 270a downward through bushing 270b against the force exerted by springs 270c. This causes abutment 270 to swing downward pushing push rod 268 in carrier 227 downward, causing fingers 261 to release their grip on toolholder 26. Note that the toolholder is still supported by hand socket edges 257a. At the same time, cam G' opens switch G causing the fingers 145 on the drawbar 140 to close grasping adapter 143 of toolholder 26 preventing the toolholder from leaving the socket 213 as hand 230 withdraws.

As the toolholder is thus received in the spindle, the concentric portion 237 of the box cam 235 engages the roller 233 on the arm 223, as shown in FIG. 41, and causes the latter to remain in its raised horizontal position while the crank arm 250 moves the rack bar 249 to the right reversing the direction of rotation of the gear 248, sprocket wheel 242 and the direction of travel of the carriage to withdraw the end portions 257 of the hand 230 from the toolholder and bring the empty carriage back toward the center of the rack 218 to a position clear of the toolholders thereon, at which time rotation of the box cam and crank arm is stopped by deenergizing the motor AM.

In inserting a toolholder in or withdrawing it from the spindle taper it is important that it not rub against the spindle taper beyond that amount needed to seat or unseat it. This requires that the path of motion of the end of hand 230 be accurately controlled in the proper path as it moves between its lower position and its upper position as shown in FIG. 22. The carriage 227 is positioned by chain 241 wrapped around sprocket 242. Thus, if sprocket 242 remains essentially fixed while arm end 223a moves vertically the carriage 227 describes an involute path. When the carriage is extended in a raised horizontal position as shown in FIG. 22, crank 250 and gear rack 249 are in a dead-center condition so that carriage velocity along track 225 is zero (FIG. 35). Continued motion of crank 250 in a counterclockwise direction then begins to impart a clockwise rotation to gear 248 and sprocket 242 which moves carriage 227 away from the spindle as cam 235 lowers hand 230 to withdraw the toolholder 26 from the spindle taper. This motion combined with the involute path of carriage 227 described above would cause interference between toolholder 26 and the spindle taper as the toolholder is inserted or removed were it not for a compensating motion imparted by the design of the mechanism as described below. The center of rotation of gear 248 and sprocket 242 is offset from the pivot 231 (FIG. 23) on which arm 223 rotates under the influence of portions 238 and 239 of the track in cam 235. As may be seen in FIG. 22, when arm end 223a is lowered pivoting about shaft 231 the center of gear 248 is moved essentially parallel to gear rack 249 in a direction away from rack pivot 249a. This imparts a counterclockwise rotation to gear 248 and sprocket 242 extending carriage 227 toward the spindle center line in an amount proportional to the angular movement of arm 223. This motion is superimposed on those described above to give toolholder 26 a path of motion such that it enters into or is withdrawn from the spindle taper without interference or excessive rubbing action.

As soon as the carriage is clear of the spindle, the programming apparatus, as explained below, causes the mechanism of the machine tool to rotate the spindle 24 and the tool therein at a determinate speed and causes the quill mechanism to function to advance the tool to the workpiece.

It should be noted that the sequence of operations of extracting the used toolholder from the spindle and returning it to position of rest over the tool rack is the reverse of that occurring when taking the toolholder from the tool rack to the spindle. Each of these operations is accomplished by the continuous operation of the motor AM in one direction and without the use of reverse gears, by the crank arm 250 passing over the dead-center line and reversing the direction of rotation of the sprocket wheel 242 and the direction of travel of the sprocket chain 241.

TOOL ORIENTING

In order to orient the rotative position of the tool in the tapered socket 23 of the spindle and to provide a positive drive between the spindle 24 and the toolholder 26, the nose of the spindle has a slot 185 in which a downwardly extending lug 184 is located and the toolholder 26 has a flange 259 provided with a radial slot 186 which slidably receives the lug 184 and forms a positive driving connection between the spindle 24 and the toolholder 26. When the toolholder is to be used in a tool changing machine, diametrically opposite the slot 186, the flanges 259 and 260 have radial slots 187 and 187a. Slot 187 is entered by a lug 188 on the tool carrying hand 230 to maintain the toolholder properly orienting in traveling to and from the spindle. Each socket 221 of the tool rack 218 as shown in FIG. 24 has a lug 189 which engages the slot 187a in the flange 260 which maintains orientation of the toolholder while being stored in the rack.

The slot 187 in the flange 259 of the toolholder is narrower than the slot 186 so that it will not receive the lug 184 on the spindle, thus maintaining a 360° orientation.

Groove 258 is not as deep as groove 258a so that it will not allow its inadvertent engagement in the tool rack socket.

If the orientation of the tool is to be maintained, the spindle must be stopped, before any tool changing operation can be performed, at precisely the same oriented position each time it stops to eject a tool and receive another tool. For this purpose a a resolver 88, see FIGS. 1, 2 and 5, is employed. The resolver 88 is secured at 90 to the plate 63 secured to the gear shift sleeve 43 so that it will travel vertically with the sleeve 43 and the driving sleeve 39. The resolver may be of the synchro-brushless type having a stator and a rotor having a non-slip pulley 88a and non-slip belt 88b engaging a timing pulley 88c secured to the spindle driving sleeve 39.

The operation of the resolver 88 is described below in connection with operation of automatic tool changing.

TOOL RACK INDEXING

The indexing of the tool rack is accomplished in the form of the invention illustrated herein by a step-by-step intermittent movement, shown in FIGS. 22, 24, 42 and 43, that comprises a turntable 219 which, as shown in FIG. 42, is integral with a hub 278 rotatably mounted on the stationary bearing 220 secured to the part 217 of the main frame 210. The tool rack 218 is secured to the turntable 219 which has a plurality of open, equispaced radical U-shaped peripheral slots 279, one for each U-shaped socket 221 in the tool rack 218.

Figure 43:
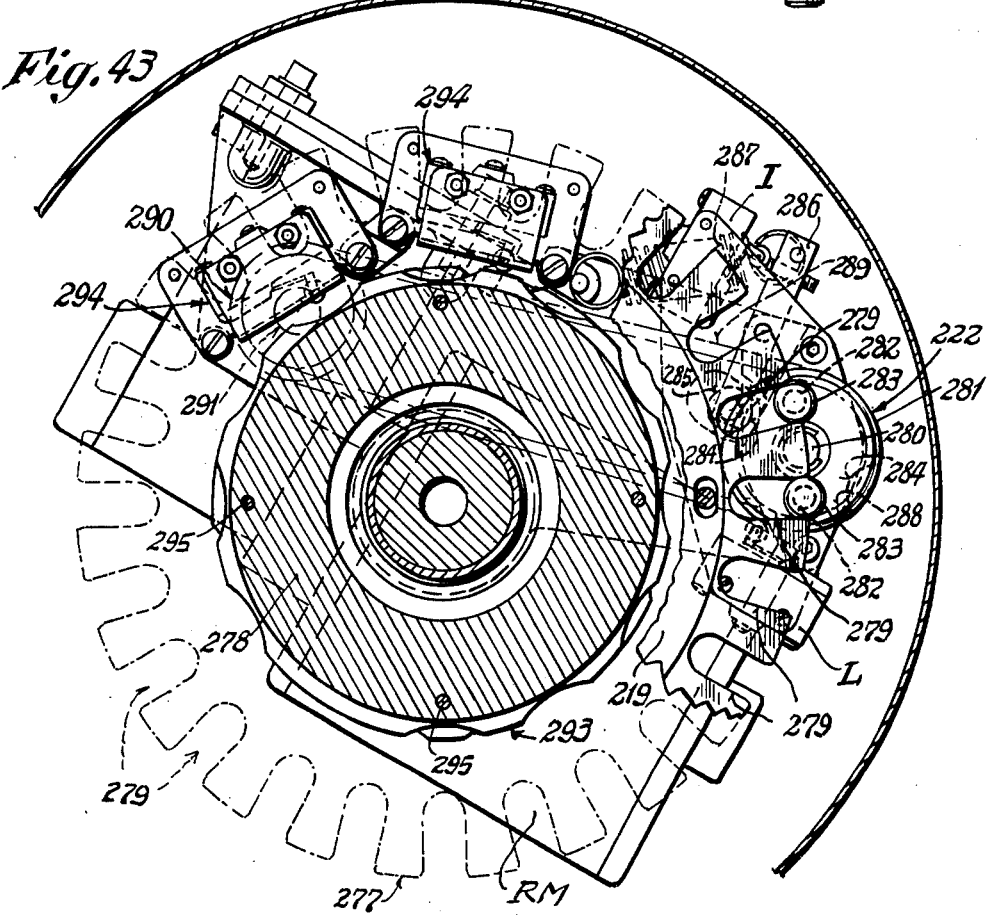
FIG. 43 is a horizontal section taken on the line 43—43 of FIG. 42 of a portion of the turntable and indexing means therefor, with a portion of the former being broken away to show the index controlling cams and switches.

Supported on the portion 217 of the main frame 210 is a vertical indexing shaft 280 carrying on its upper end a head 281 having two projecting pins 282 located diametrically opposite each other and each having a roller 283 located in the horizontal plane of the turntable 219 as shown in FIGS. 42 and 43.

The shaft 280 and rollers 283 are so positioned relative to the slots 279 that when both of the rollers 283 are located in adjacent slots 279 in a position of rest as shown in full lines in FIG. 43 with the axes of the rollers 283 on the arc of rotation of the disk 277, the latter will be locked against rotation in either direction. When, however, the shaft 280 is rotated through an angle of 180°, one of the rollers 283 will move further in into its slot 279 and this will cause the turntable 219 and rack 218 to rotate one step, the other roller 283 at the same time moving out of its slot and finally moving slightly into the next adjacent slot 279 before the first referred to roller entirely leaves the slot which it occupies. This locks the turntable 219 and rack 218 against rotation.

The head 281 has diametrically opposite arcuate recesses 284 adapted to be engaged by a detent roller 285 mounted on an arm 286 and urged against the head 281 by a spring 287 for the purpose of yieldably holding the head 281 in rack-locking position. The detent roller 285 insures that socket 221 in the rack axially aligns with the carriage socket 256 in the mechanical hand 230 on the carriage 227.

The rack indexing shaft 280 carries a sprocket wheel 288 which is driven by a chain 289 connected by a sprocket wheel 290 on the shaft 291 of a rack motor RM which is controlled by switching means referred to below. An electric clutch 292 between the index shaft 280 and the sprocket wheel 288 driven by the motor RM prevents the momentum of the motor RM from overthrowing the indexing mechanism.

It should be understood that while the turntable may be moved to advance one step for each 180° of rotation of the shaft 280, the motor RM may continue to rotate the rack to advance any number of steps in either direction that may be required to present a particular toolholder and its tool in position for transfer to the spindle.

Figure 44:
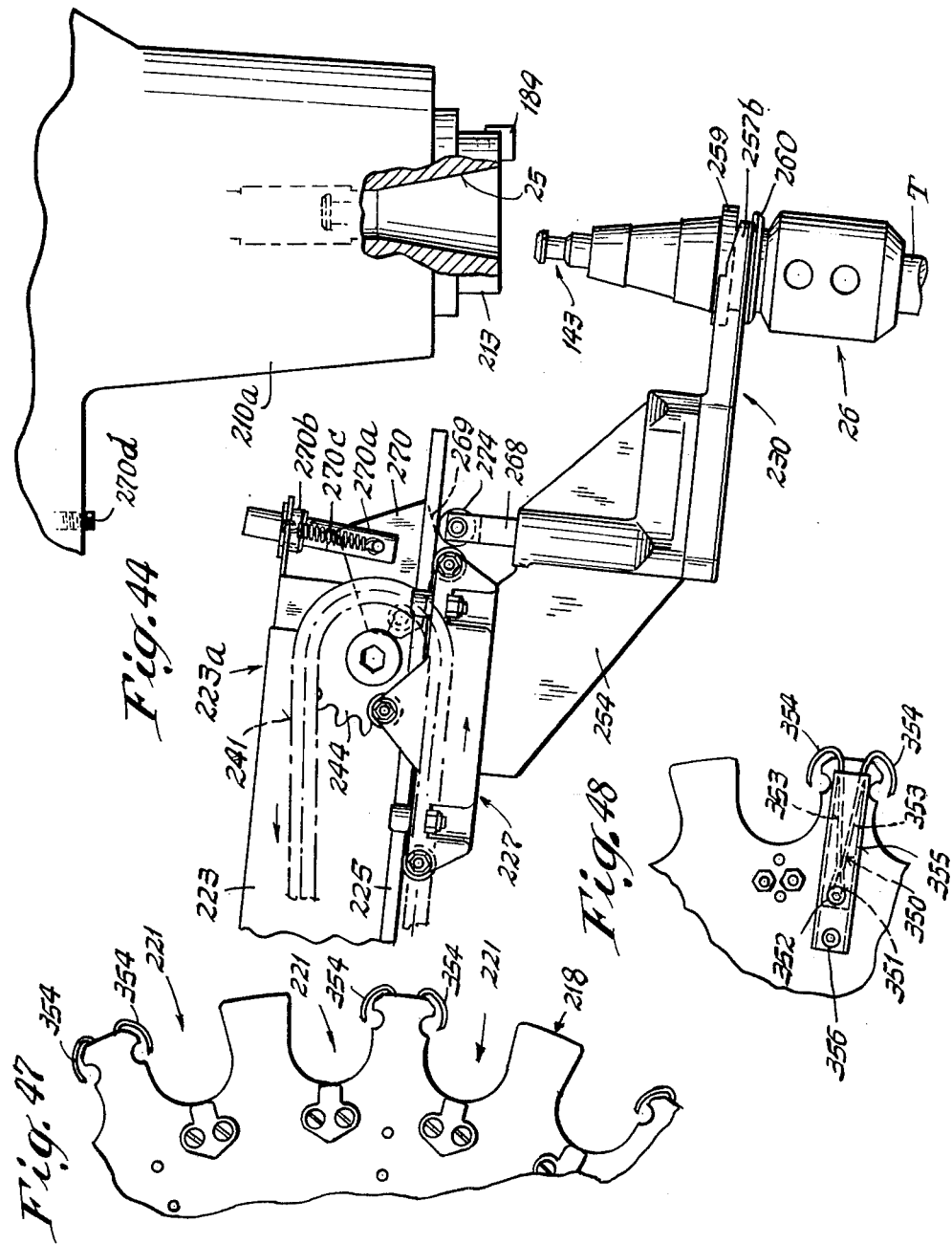
FIG. 44 is a side elevation showing in full lines the distal end of the arm and carriage thereon in depressed position just before the carriage is raised to deposit the toolholder in the spindle socket.

For the purpose of positioning a selected toolholder which is to be transferred to the spindle, the present invention provides a plurality of cams 293 which are supported on the hub 278 of the turntable 219 and positioned to engage a plurality of switches 294, one for each cam 293. The switches 294 are connected in binary coded decimal circuits controlled by the programming apparatus, as explained elsewhere herein, and stop the rotation of the indexing motor RM and the tool rack 218 when a predetermined tool rack socket 221 is positioned in front of the toolholder carriage 227. As shown in FIGS. 42, 43 and 44, there are six cams 293 and six switches 294, since in the form shown there are twenty-four toolholder sockets 221 in the tool rack. The cams and switches represent the binary values 1, 2, 4, 8, 10 and 20.

The cams 293 are held in predetermined relative positions by screws 295 extending through predeterminately positioned holes in the cams.

As will appear more fully below, the detent arm 286, which controls the position of the tool rack to receive and deliver toolholders, operates a switch I which opens certain of the control circuits while the rack is being indexed to prevent the electric confusion caused by the opening and closing of the binary switches 294 when the control is hunting for the next tool to be used from misrepresenting the actual position of the tool rack.

AUTOMATIC TOOL CHANGING

The improved method of changing tools in an automatic tool changer adapted for use with a machine tool comprises, according to the present invention, the following steps: When the operation with the tool in the spindle 24 is completed and the quill 21 is at its uppermost position and the workpiece is suitably positioned out of the path of the tool changer arm, the empty mechanical hand 230 on the tool transfer carriage 227 is caused to advance on the arm 223 leading from the tool rack 218 to the spindle and grasp the tool in the spindle. The tool is then released from the spindle and the carriage and arm descends to extract the tool from the spindle and carry it back to the tool rack where it is deposited in the toolholder socket from which it had been taken. When the hand is clear of the deposited toolholder, the rack is rotated more or less to the right or the left (depending on the program command signal) to bring the next tool to be used to the position of the mechanical hand.

When this has been done, the direction of rotation of the carriage driving motor AM is reversed and the tool in the carriage travels to the spindle. When the carriage approaches the spindle, the arm descends so that the adapter on the toolholder clears the spindle and then the arm is raised to insert the toolholder in the spindle. In the meantime, the finger hooks in the spindle have been held in retracted position for the reception of the toolholder adapter. Coincident with the insertion of the toolholder in the spindle, the push rod in the drawbar is operated, allowing the finger hooks to engage the adapter and secure the toolholder in the spindle. While this was occurring at the upper limit of movement of the arm and carriage, the toolholder gripping means on the mechanical hand releases the toolholder. Then, without interrupting the movement of the carriage, the hand is moved away from the toolholder in the spindle and travels back to the tool rack where it remains while the tool in the spindle is being used. As soon as the toolholder is in the spindle, the tool retention operation takes place. This involved releasing the drawbar springs, causing the drawbar to pull the toolholder securely into the spindle socket. As will appear below, these operations are performed by circuitry which causes the operations to take place in predetermined sequence, the various operations being disabled unless preceding operations have been completed.

Figure 46:
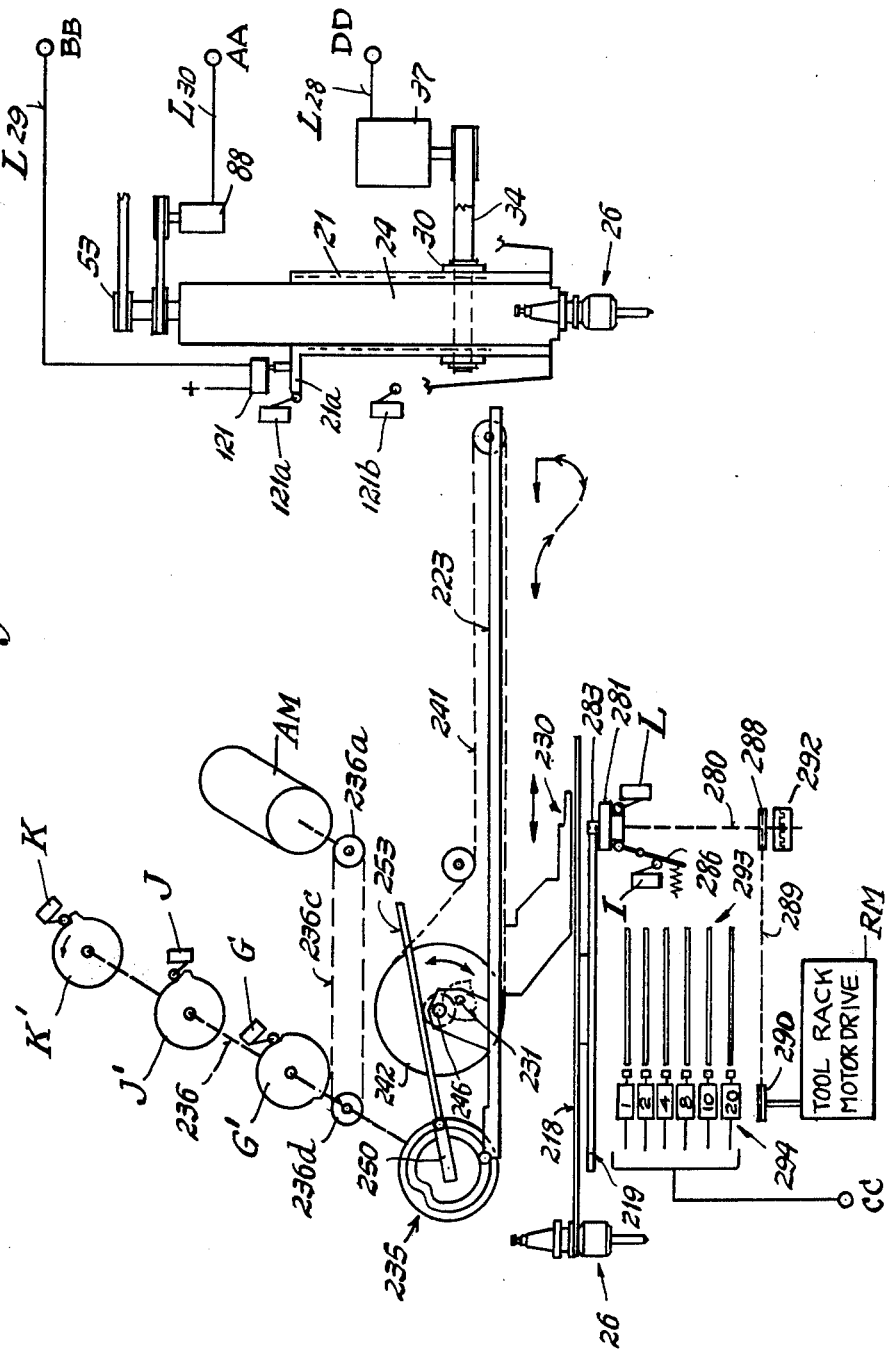
FIG. 46 is a diagrammatic view showing the relationship between the tool changing mechanism and the spindle of the machine tool.

Referring to FIGS. 24 and 46, in order to coordinate the operation of the toolholder carriage with other functions of the machine, the shaft 236 which carries the box cam 235 and crank 250 which drives the carriage to and from the spindle has secured to it three cam disks G', J' and K' which are positioned to operate switches G, K and J in predetermined sequence as the shaft 236 rotates.

The switch G is actuated when the hand 230 engages the old tool in the spindle and furnishes one enabling signal which, as explained below, energizes the secondary diaphragm solenoid valve S3 resulting in the releasing of the finger hooks and the ultimate ejection of the used tool from the spindle.

The switch K has two functions, one when the tool carriage is back over the rack which results in the arm motor AM being deenergized and the other in which the tool rack motor and electric clutch are energized.

The switch J in one position provides an enabling signal which results ultimately in the direction of drive of the arm motor AM being reversed, and in the other position provides an enabling signal to the control circuitry which with another signal indicates that the tool change has been completed.

There are two switches associated with the index mechanism, one of these being the switch I which is actuated by the rack detent to open one of the enabling circuits to activate the arm drive motor AM while the toolholder rack is turning. The other switch is the switch L which is activated by the indexing drive wheel 281 during the middle portions of each step in the indexing cycle of the tool rack to isolate the control circuits from the indeterminate transition conditions that the binary cam switches 293 go through during middle portions of each step in the cycle.

Figure 45:
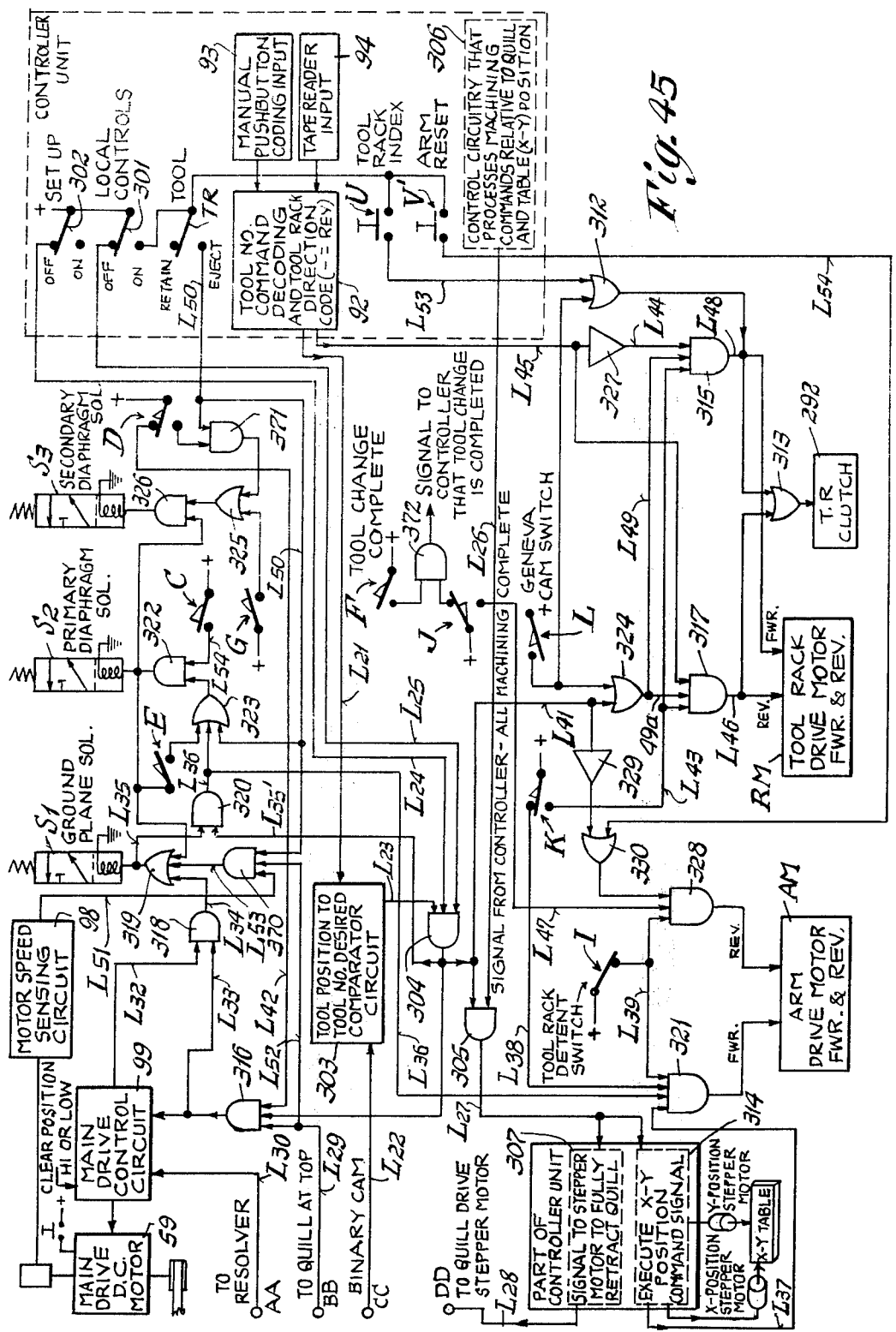
FIG. 45 is a diagram showing the various circuits and components to control the manual or program controlled operations of the tool changer and the spindle and worktable mechanism of the present invention.

The circuits for the automatic tool changer are shown in FIGS. 45 and 46.

Before the circuits for the automatic tool changing operation can be activated, a local control switch 301 and a set-up switch 302 must be in their "off" positions shown in FIG. 45.

A signal for a particular tool may be initiated by a tool number command decoding and tool rack direction code control referred to below as "tool and rack control 92" or by a manual push button coding input 93 or tape reader input 94.

Since the circuit for the tool rack motor RM is preset to rotate clockwise, for example so that the tool rack will rotate counterclockwise, if the next tool to be transferred to the spindle can be reached more quickly by rotating the tool rack clockwise, the direction of operation of the motor may be reversed. When this condition exists the tool and rack control 92 signal must be accompanied with a negative signal.

For instance, if the tool which was in the spindle was 12 and the next tool to be used is number 9 (assuming that the numbers of the tool socket ascend in clockwise order from 1 to 24) a negative signal will be sent to the tool rack motor RM to drive the tool rack clockwise. If, on the other hand, the number of the next tool to be used is 15 no negative signal will be sent to the rack motor RM and it will rotate the tool rack counterclockwise.

The code for the tool number of the next tool to be transferred to the spindle is sent by a lead L21 from the tool and rack control 92 to a comparator 303 where it is compared with the code signal received via a lead from cable L22 from the tool rack binary switches 293 which indicates the number of the toolholder socket 221 of the tool then in the spindle. The circuitry always assumes this condition whether or not there is actually at the time a tool in the spindle.

If the comparator 303 senses that the numbers are not equal, a tool change operation will be enabled and at the conclusion of all other machine operations then in progress the spindle and table will be positioned so that the tool can be changed.

If the comparator senses no difference between the signals from the tool and rack control 92 and the binary switches 293, the tool changing operation would be omitted.

The unequal signal is fed by lead L23 to AND gate 304 along with a signal received over lead L24 that confirms that the set-up switch 302 is in "off" position and a signal received via lead L25 which indicates that the local swtich 301 is off. The output of AND gate 304 is passed to several other circuits including AND gate 305 which also receives signals via lead L26 from the controller 306 indicating that all of the machining operations have been completed. The output of this AND gate 305 via lead L27 initiates a command signal issuing from a part 307 of the controller 306 which has a lead L28 to the quill motor 37 to fully retract the quill 21 on the Z-axis, and also to activate the X-Y positioning means 314 to move the work and/or worktable, diagrammatically illustrated in FIG. 45.

The upward movement of the quill results in the latter engaging the Quill-at-Top switch 121, see FIG. 45, which via lead L29 triggers AND gate 316 to place the spindle in "position-loop" under the control of the feedback voltage from the resolver 88 which is connected to the main drive control circuit 99 by lead L30. The resolver 88 effectively supplies a D.C. drive signal to the spindle drive motor circuit 99, the magnitude of which is proportional to the rotational position of the rotor of the resolver and a predetermined starting position. The resolver 88 is a two phase rotary transformer, the secondary windings of which consist of two fixed windings at right angles to each other. The primary is actually one winding on the rotor. Hence, the voltage induced from the primary to either secondary winding is dependent upon the orientation of the primary, i.e., the rotor shaft and spindle, relative to the resolver stator. There are two positions where the voltage induced into the stator winding as a minimum, but each one corresponds to a maximum voltage being induced into the other winding, but out of phase by 180°. This latter condition is used by the control circuit 99 to differentiate between the two minimum voltage points, so that only one is recognized as the desired spindle orientation position. Hence, the resolver output can be used to stop the spindle at the proper position since the motor drive circuit is made to depend upon the resolver's output.

Once the spindle has been properly positioned, a signal is delivered from the main drive control circuit 99 via lead L32 to AND gate 318 which is enabled by a signal via lead L33 from the AND gate 316 and sends a signal via lead L34 to OR gate 319, hence to the ground plane solenoid Sol. 1 to activate the ground plate 159 to hold the spindle in its uppermost position.

At the same time, from OR gate 319 through lead L35, a signal is sent to AND gate 320 which was enabled by a signal via lead L35' from AND gate 304. A signal is sent from AND gate 320 via lead L36 to AND gate 321 to initiate operation of the arm drive motor AM in the "forward" direction, i.e., the direction required to drive the carriage with the empty hand to the spindle to eventually remove the just used toolholder and carry it back to and deposit it into the tool rack socket 221 from which it had been taken.

The drive motor AM will be energized in the forward direction only if AND gate 321 is conductive, and that is when the following conditions are also satisfied: (1) a signal is received by AND gate 321 via lead L37 that the X-Y table positioning move has been completed, (2) a signal is received via lead L38 that the switch K operated by cam K' on cam shaft 236 is in the position which occurs when the carriage is positioned at the tool rack in an attitude corresponding to the beginning of a tool removal cycle, and (3) another signal is received via lead L39 that the tool rack detent switch I is closed indicating that the tool rack is stationary in a detented position. Then the toolholder carriage 227 will travel toward the used tool in the spindle.

While the carriage is traveling the ground plane locking lever 159, above referred to and shown in FIG. 19, will have actuated switch C (which occurs when the ground plane lever is fully engaged with the spindle), thereby energizing the primary diaphragm solenoid Sol. 2 (FIG. 14) through AND gate 322. This moves the drawbar slightly to take the drawbar holding force off the finger hooks. The AND gate 322 was enabled by a signal from AND gate 320 through lead L36 and OR gate 323, see FIG. 45.

The operation of the primary diaphragm plate 153 will result in the actuation of switch D which deenergizes lead L42 and disables AND gate 316 to discontinue the main drive motor control circuit 99 from holding the spindle in its oriented position, which is no longer necessary because the primary diaphragm plate 153 will have clamped the spindle in place. All of the foregoing will have been completed before the toolholder transporting carriage reaches the spindle.

When the hand 230 on the carriage 227 reached the position to engage the used toolholder in the spindle, the cam switch G is actuated, and sends a signal through OR gate 325 to AND gate 326 which had been enabled by AND gate 322 and switch C, thus enabling AND gate 326 to cause the solenoid Sol. 3 to activate the push rod 166 to unlock, release and eject the used toolholder from the spindle.

It should be noted that actuation of the secondary diaphragm was delayed until the hand 230 was actually in position to support the toolholder.

At the beginning of the movement of the secondary diaphragm plate 163 it causes the switch E to close a holding circuit including OR gate 323 and AND gate 322 so that the solenoid valve S2 will continue to hold the spindle depressed and the finger hooks 146 unlocked until the used toolholder is removed from the spindle and the new toolholder is in place in the spindle. The holding circuit is still being enabled by switch C which was closed when the ground plate lever 159 engaged the spindle.

When the used toolholder has been grasped by the mechanical hand 230, the carriage with the used tool travels to the rack and deposits the toolholder in its socket in the tool rack in storage position.

When this occurs the cam switch K will be actuated to deenergize lead L38 and disable AND gate 321 and the arm motor AM. At the same time a signal is sent via lead L43 to AND gate 317 in the circuit of the rack motor RM. The direction of the rack drive will depend upon whether or not a negative (—) signal was included in the original command.

Assuming the signal was not in the negative, when the AND gate 304 was made conductive, a signal was sent via lead L41 to an OR gate 324 which passed a signal via lead L49 to AND gate 315 which controls the rotation of the tool rack motor RM in a forward direction, for instance clockwise, by lead L48.

However, two other conditions must prevail before the AND gate 315 becomes conductive. One condition is that the cam switch K must be in the position engaging the lead L43 to send a signal to AND gate 315, and the other is that a signal must be received by lead L44 from inverter 327 which is connected to the tool rack direction code 92 via lead L45.

When this is done, the rack motor will rotate as a result of a signal on lead L48 from AND gate 315. This signal is also directed to OR gate 313 to energize the tool rack electric clutch 292. This clutch connects the motion of the rack motor to the tool rack.

If the signal was negative, the tool rack drive motor RM would be caused to rotate in the opposite direction, counterclockwise, by a signal from AND gate 317 which is connected to the motor by lead L46 and is enabled by a signal received from lead L492 connected to OR gate 324 and cam switch K via lead L43, and from lead L45 from the tool rack direction code 92. Thus, when the rack drive motor RM is energized by the negative signal via lead L46, it will rotate the tool rack counterclockwise, since once again the electric clutch 292 will be energized through the OR gate 313 via lead L46.

The tool rack will continue to rotate until the 9 toolholder is brought to position in front of the carriage (assume 9 is the new tool desired).

As the tool rack advances from one position to another, the binary cam switches will change according to the position of the rack. The Geneva cam switch L is actuated during the middle portions of the rack indexing cycle, and isolates the control circuit from the indeterminate transition conditions that the binary cam switches go through during this middle portion of the cycle. When the rack moves to the desired tool socket, the "unequal" signal from the comparator 303 goes off. This results in the deenergization of the rack drive motor RM and the operation of the clutch. At the same time the arm motor AM is energized in the reverse direction after the tool rack detent switch I is actuated. It should be noted that AND gate 328 which energizes the arm motor AM in the reverse direction is enabled by switch I, cam switch J (in the released position at this time on lead L47) and the inverting of the "unequal" signal being off (via inverter 329 and/or gate 330).

The hand 230 will remove the selected tool from the rack and carry it to the spindle, where it will be retained since at this point of the hand's stroke, cam switch G will be released, thereby deenergizing secondary solenoid (Sol. 3). The hand 230 will continue back toward the tool rack. At the same time, the holding switch E will be released once the tool has been gripped by the hooks. This results in the deenergizing of the primary solenoid (Sol. 2) and the ground plane solenoid (Sol. 1). Thus the tool is fully retained and the ground plane lever 159 is retracted as indicated by tool change complete switch F.

Finally, when the carriage has returned fully to the tool rack cam switch J will be actuated. This results in the deenergizing of the arm motor AM and the initiation of the signal which will be given to the control unit 306 that the tool change is complete, provided that switch F is also actuated by the ground plane lever.

As stated above, as the carriage is being returned to the tool rack its speed is decelerated and it is gradually stopped. This not only eliminates the noise that would be produced if abutment elements cause the carriage to stop, but also reduces the wear and tear on the parts.

However, the situation with the tool rack is different because the motor and rotor have considerable mass and overthrow of the rack would occur.

To avoid this problem the tool rack motor RM is connected to the index mechanism by an electric clutch 292 having an OR gate 313 connected to AND gates 317 and 315 so as to clutch the motor RM to the indexing mechanism when either AND gate is conductive, but more important declutch the motor RM instantly when the AND gate is deenergized thereby allowing the tool rack to stop without having to absorb the high inertial energy that is stored in the armature and gear train of the motor RM.

In FIGS. 47 and 48 we have shown in modified form means for yieldingly holding the toolholders 26 in their sockets 221 in the tool rack. In this form of our invention, in the spaces between each alternate pairs of sockets 221, there is provided a retaining spring 350 which, midway between its ends is bent upon itself to form a loop 351 which is secured to the tool rack by a bolt 352, and two radially extending legs 353, each having an outwardly curved end 354 projecting into an adjacent socket 221 and adapted to enter the annular groove 258a in the toolholder and yieldingly engage the bottom of said groove to hold a toolholder against accidental removal from a socket, as shown in FIGS. 47 and 48.

As shown in FIG. 47, the outward movements of the ends 354 of the legs 353 of the spring 350 are limited by a casing 355 each secured to the tool rack by one of said bolts 352 and additional bolt 356.

To prevent the toolholder carriage 227 from rebounding when it reaches its terminal position over the tool rack, the present invention provides a detent arm 357 positioned to engage the roller 228 on the carriage 227 and yieldingly hold the carriage in the desired position. The detent arm 357 is pivotally mounted on a bracket 358 secured to the flange 225 of the track 223 by screws 359, see FIG. 22a.

Mounted on the rail 225 and projecting upwardly therefrom is a screw 360 which extends through a hole 361 in the detent arm 357. The screw 360 is secured to the bracket 358 by a spacer 362 and a screw nut 363 which limits the downward movement of the detent arm 357 to the position shown in FIG. 22a where its downwardly and forwardly sloping surface 357a engages the roller 228 on the toolholder carriage.

The detent arm 357 is yieldably held in carriage-detaining position by a coil spring 364 positioned between a washer 365 on the upper edge of the detent arm 357 and a washer 366 engaging a nut 367 on the upper end of the screw 360.

The forward end portion of the detent arm 357 has a cam surface 368 shaped to be engaged by the roller 228 on the carriage to lift the detent arm 357 over the roller as the carriage approaches its terminal position.

The spring 364 has sufficient force to resist any tendency of the carriage to rebound, but is insufficient to prevent movement of the carriage under the power of the carriage driving motor AM.

AUXILIARY CONTROLS

There are two switches available in the circuit (see FIG. 45): switch U to manually index the tool rack, independently of the tool changer operation; and switch V' to reset the arm should it get out of position due to an interruption of the tool changer cycle. In both cases these switches U and V' are not functional until the local control switch 301 is in "on" position.

Pressing the tool rack index switch U will result in the rack indexing forward step by step continuously until the switch is released. The circuit is from the switch U through lead L53 to OR gate 312 as shown in FIG. 45. Another input to this OR gate 312 is from the Geneva cam switch L. This insures that the tool rack will continue to advance a full position once the push button switch U has been released.

When the ground plane plate 159 moves clear of the spindle, the switch F and the carriage return switch J are closed, AND gate 372 signals the control circuit 306 that the tool change is complete, see FIGS. 7 and 45.

Pressing the arm reset push button switch V' will result in the energization of the arm drive motor AM in the reverse direction via lead L54, OR gate 330 and AND gate 328. This will return the hand 230 back at the tool rack 218 in a position corresponding to the completion of a tool change cycle. The AND gate 328 was enabled by the tool rack detent switch I and the cam switch J. For the arm to move, the reset switch V' must be held depressed. When the arm is fully restored, the actuation of the cam switch J will deenergize the arm motor AM, even with the reset switch button depressed.

In order that the spindle driving motor 59 and the spindle may be quickly and effectively stopped in case of an emergency, the motor 59 is provided with a brake 369, see FIGS. 1 and 6, which is electromagnetically rendered inoperative when the motor is energized.

MANUAL CONTROL

Referring to the manually controlled apparatus illustrated in FIG. 45, when it is desired to change tools in the spindle this is achieved by placing the local control switch 302 on. The quill must be fully retracted by the operator so that the quill-at-top switch is actuated. Then the operator must turn off the spindle drive motor in order to be ready for tool ejection. The tool in the spindle is held by the operator and the tool switch TR is placed in eject position. This will result in sending a signal via lead L50 to AND gate 370 and from the latter via lead L53 to OR gate 319 thereby energizing the ground plane solenoid (Sol. 1) since the AND gate 370 was enabled by lead L51 from the motor speed sensing circuit and lead L52 from the quill-at-top circuit. When the ground plane plate 159 is fully engaged it will close switch C. This through lead L54 and AND gate 322 will energize the primary diaphragm solenoid (Sol. 2). When the primary diaphragm is fully extended it actuates switch D which enables AND gate 371 and through OR gate 325 and AND gate 326 which was enabled by a signal from lead L52 and thus energizes the secondary diaphragm solenoid (Sol. 3), thereby ejecting the tool into the operator's hand.

To retain a new tool, the mechanism must be in the eject mode described above. The new tool is inserted into the spindle and the tool switch TR is placed in retain position. This will cause secondary diaphragm solenoid (Sol. 3) to be deenergized. At the end of the retraction stroke of the push rod 166 (which is under the control of the solenoid Sol. 3), the holding switch E will be released, thereby deenergizing both solenoid Sol. 2 and Sol. 1. This will result in the tool being retained and the ground plane plate 159 being retracted from engagement with the spindle. The latter action will reactivate the tool change complete switch E, thereby signalling to the controller circuit that it may proceed with machining operations.

Quill control switch 121b (FIGS. 1 and 3) is secured to a collar 121c slidably mounted on a vertical screw 121d fixed in a bracket 121e secured to the side of the spindle frame. The vertical position of the switch 121b is controlled by a nut 121g engaging the bottom of the collar 121c. The switch 121b is operated by the edge of the quill plate 21a and functions to open the circuit to the motor 59 to prevent the quill from driving the tool in the spindle accidentally too deeply into the work and/or into the worktable. It also would keep the quill plate from being damaged on the quill feed nut housing.

The secondary diaphragm plate 164 is yieldably supported in its raised position on the primary diaphragm plate 153 by springs 164a lying in cups 164b mounted in the plate 153, see FIGS. 2 and 9.

The lever 137 has a spring 138 for maintaining the holding circuit switch E closed until operated by the pin 139, see FIG. 14.

The rubber cushions 19d surrounding the screws 19 absorb the shock when the edge of the portion 18 descends on the horizontal support 12 under the force of the springs 19b.

As pointed out above, the velocity of the carriage as it approaches the tool rack is virtually nil. However, it may be advantageous in certain situations to provide a positive stop for the box cam 235 when the hand on the carriage is in the most advantageous position to deposit a used toolholder in the rack, and receive a new toolholder from the rack.

For this purpose the box cam 235 is provided with a stop pin 235a which projects from its back surface and is positioned to engage a pin 235b which is fixed in the frame of the tool changer and thus avoid any tendency of the cam 235 to overthrow the crank arm 250.

The pins 235a are shown in FIGS. 34 to 41 as solid, while the pins 235b which are on the frame are shown in dotted lines.

In order to operate the arm motor AM at fairly high speed and yet instantly stop rotation of the cam shaft 236 and box cam 235 as by engagement of the stop pins 235a and 235b, the sprocket wheel 236d is connected to the shaft 236 by a slip clutch arrangement including a Belleville spring 235c and an adjustable nut 235d on the shaft 236.

The switch cams G', J' and K' are connected to rotate together and with the cam shaft 236 by a pin 236e which extends through holes 236f in the switch cams. The pin 236e is mounted on an arm 236g secured to the end of the shaft 236.

The plate 232 which carries the roller 233 is adjustably mounted on the track frame 224 having slots 232' through which mounting screws 232" extend.

While in the form of the invention herein illustrated the arm 223 is located in a plane substantially above that of the nose of the spindle, if desired the arm 223 could be positioned substantially below the plane of the spindle in which case the cam 235 and related parts would move the carriage upwardly to insert the toolholder in the spindle.

For the most part of its travel over the turntable the carriage 227 is spaced slightly above the rack to avoid the friction which would be otherwise produced between the hand portion 230 of the carriage and the rack as the turntable indexes. However, to insure proper entry of the edge portions 257 of the hand portion 230 into annular groove 258 on the toolholder, the box cam 235 has a slight rise 272 which permits the track 223 and carriage 227 to drop slightly so that the carriage can rest on the turntable and will be in the plane of the annular groove 258 when the carriage is advanced.

It should be noted here that one of the features of this invention that contributes to the simplicity of the tool changer is that a single power operated shaft 236 operates the carriage traveling means, the track arm raising and lowering means, and the mechanical hand for engaging and disengaging the toolholder. Further, the shaft 236 operates the cams G, J and K which are part of the means for controlling the tool changing operations.

Variations and modifications may be made within the scope of the claims and portions of the improvements may be used without others.

We claim:

1. A method of transferring toolholders from an indexable toolholder storage means having a row of toolholder sockets by a carriage to the spindle of a machine tool and returning the toolholder to said storage means comprising the steps of grasping and securing to said carriage a toolholder supported in one of said sockets; with a source of power advancing the carriage with the toolholder thereon to position the toolholder beneath the socket of the spindle; causing the carriage to be raised to deposit said toolholder in said spindle socket; releasing the toolholder from the carriage; without interrupting or changing the direction of operation of said source of power, moving the empty carriage to position of rest remote from said spindle; interrupting said source of power while the toolholder in the spindle is performing work; after said work has been performed, reactivating said source of power to operate in reverse direction to transport the empty carriage back to the spindle; securing the toolholder in the carriage; releasing the toolholder from the spindle and without interrupting said source of power, extracting said toolholder from the spindle, returning that toolholder to the storage means, depositing the toolholder in the storage socket from which it had been taken, moving the carriage beyond the row of toolholder-carrying sockets in the storage means; interrupting said source of power; and indexing said storage means to position the next-to-be used toolholder into position to be engaged by the carriage.

2. The method of transporting a toolholder to the spindle of a machine tool from a toolholder storage rack remote from the spindle and having a plurality of toolholder sockets, comprising the steps of moving by a source of power operating in one direction a toolholder carriage in one uninterrupted movement to take a selected toolholder from the storage rack, carry it to the spindle, insert the toolholder in the spindle and without reversing said one direction of operation of said source of power return empty to a position remote from the spindle.

3. The method of transporting a toolholder from the spindle of a machine tool to a toolholder storage rack remote from the spindle and having toolholder sockets with toolholders therein, comprising the steps of moving by a source of power operating in one direction an empty toolholder carriage in one uninterrupted movement from a position remote from the spindle into engagement with a toolholder which is in the spindle, withdrawing the toolholder from the spindle, and without reversing said one direction of operation of said source of power moving the toolholder back to the toolholder rack and depositing the toolholder into the empty socket on the toolholder rack from which it had been taken.

4. The method as defined in claim 3 in which the toolholder has an adapter having a head thereon and the spindle has a drawbar having finger hooks positioned to engage an annular shoulder of said head and also spring means for drawing said toolholder into the spindle, the additional steps of removing from said shoulder the pressure of said spring means on said finger hooks, then moving the finger hooks away from said shoulder, and striking the toolholder adapted to release the toolholder from said spindle, withdrawing the toolholder from said spindle, moving the toolholder back to the toolholder rack and depositing the toolholder in the socket from which it had been taken.

5. The method as defined in claim 3 which includes the step of causing the carriage to continue said one uninterrupted movement to a place beyond the toolholder which is deposited in the tool rack socket, and stopping the carriage at said place, said method also including the steps of indexing said toolholder rack to bring a selected toolholder to position to be engaged by said carriage, causing the carriage to engage said selected toolholder and in one uninterrupted forward movement carrying the selected toolholder to the spindle, depositing the toolholder in the spindle, and, by reverse movement, disengaging the carriage from the toolholder in the spindle and returning the empty carriage to a position remote from the spindle.

6. The method as defined in claim 5 in which each of said uninterrupted movements includes moving the carriage vertically relative to the spindle to deposit the toolholder in the spindle and to remove the toolholder from the spindle.

* * * * *